June 14, 1932. C. H. WILD 1,863,176
MACHINE FOR LABELING BOTTLES AND THE LIKE
Filed May 8, 1930 16 Sheets-Sheet 1
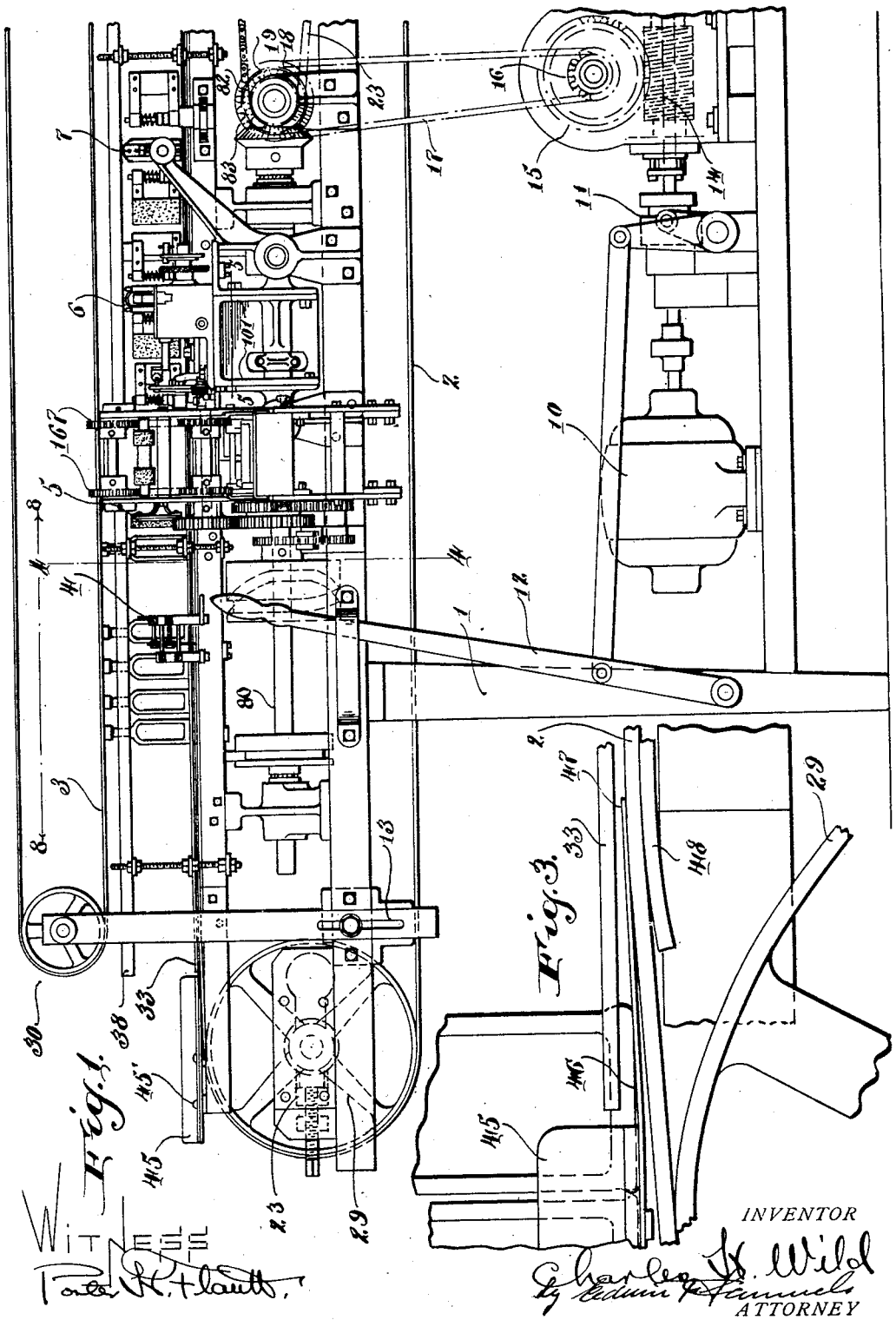
INVENTOR
Charles H. Wild
By Edwin P. Samuels
ATTORNEY

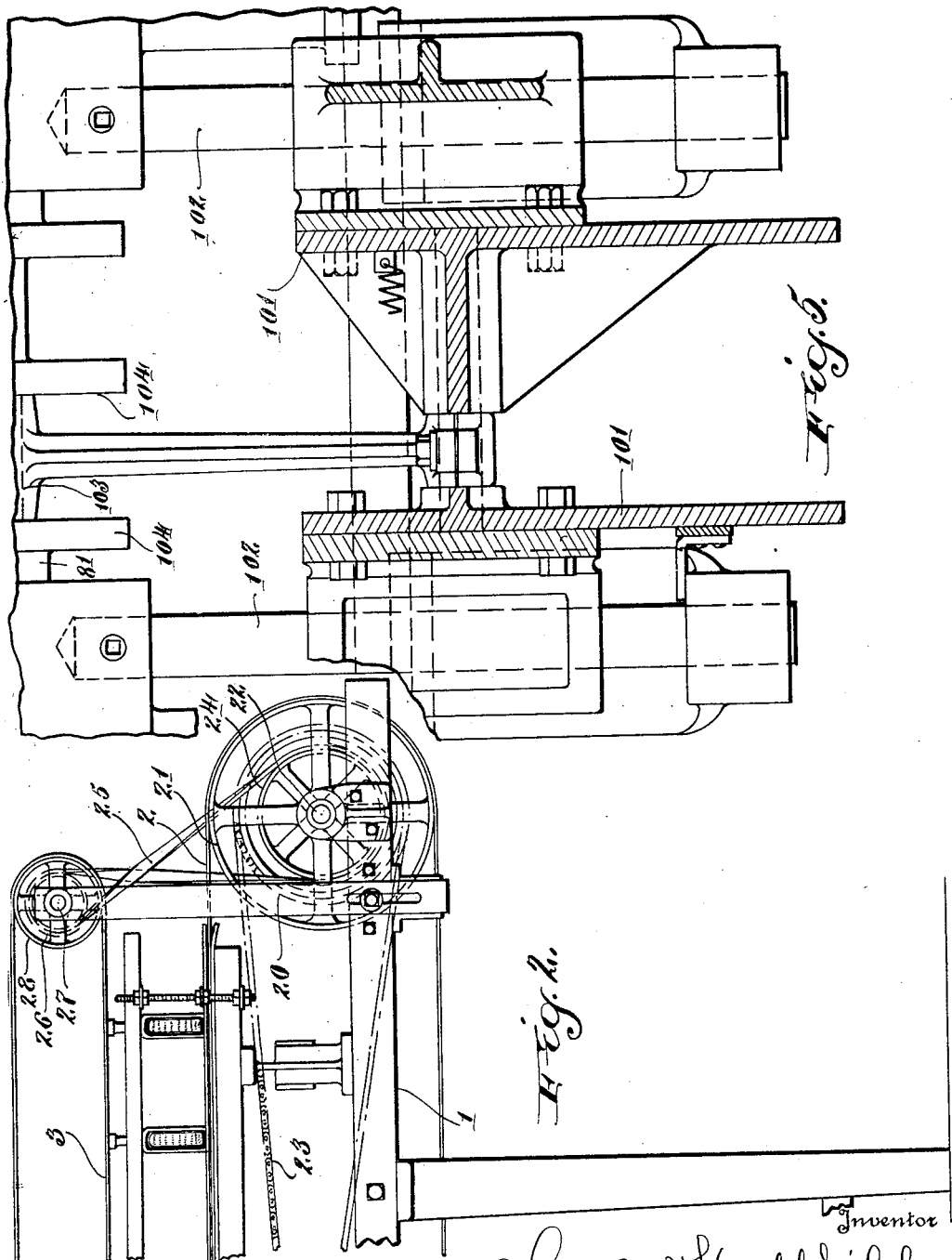

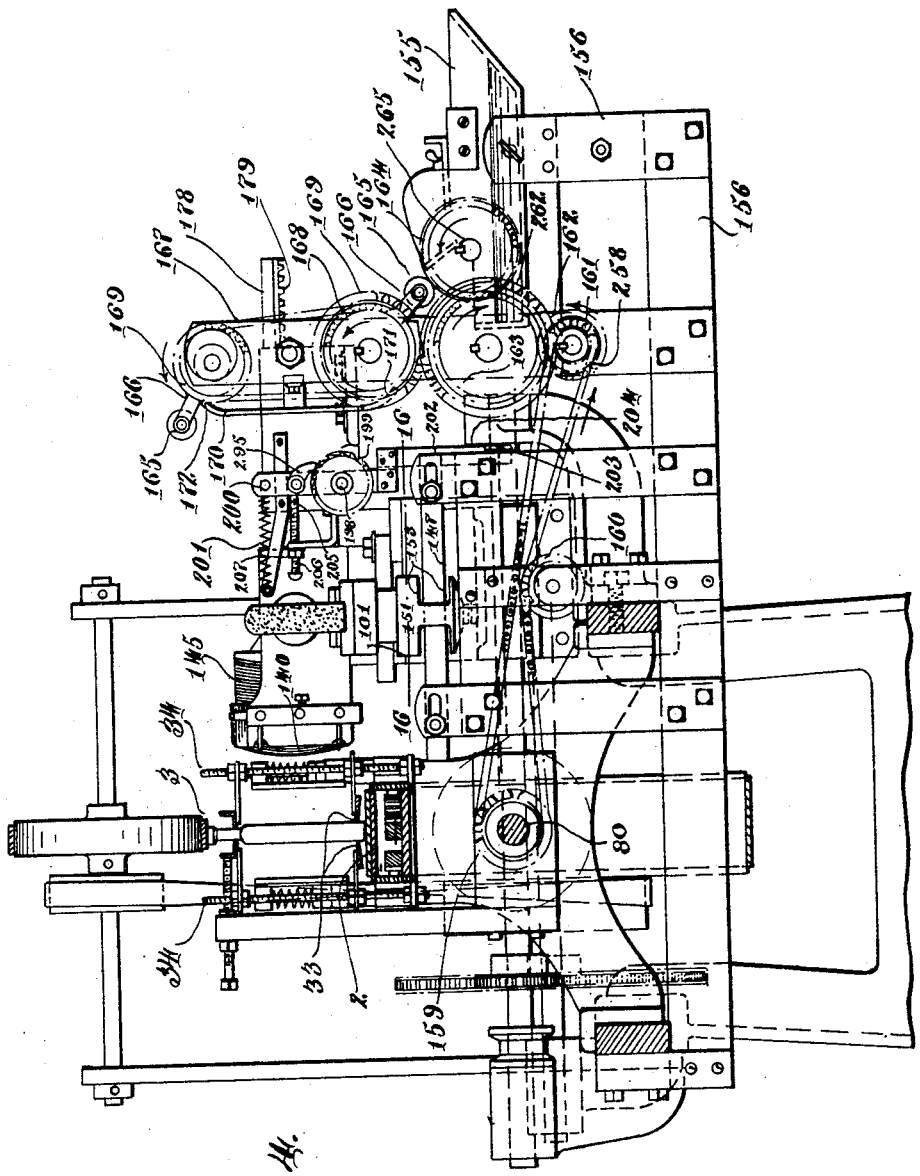

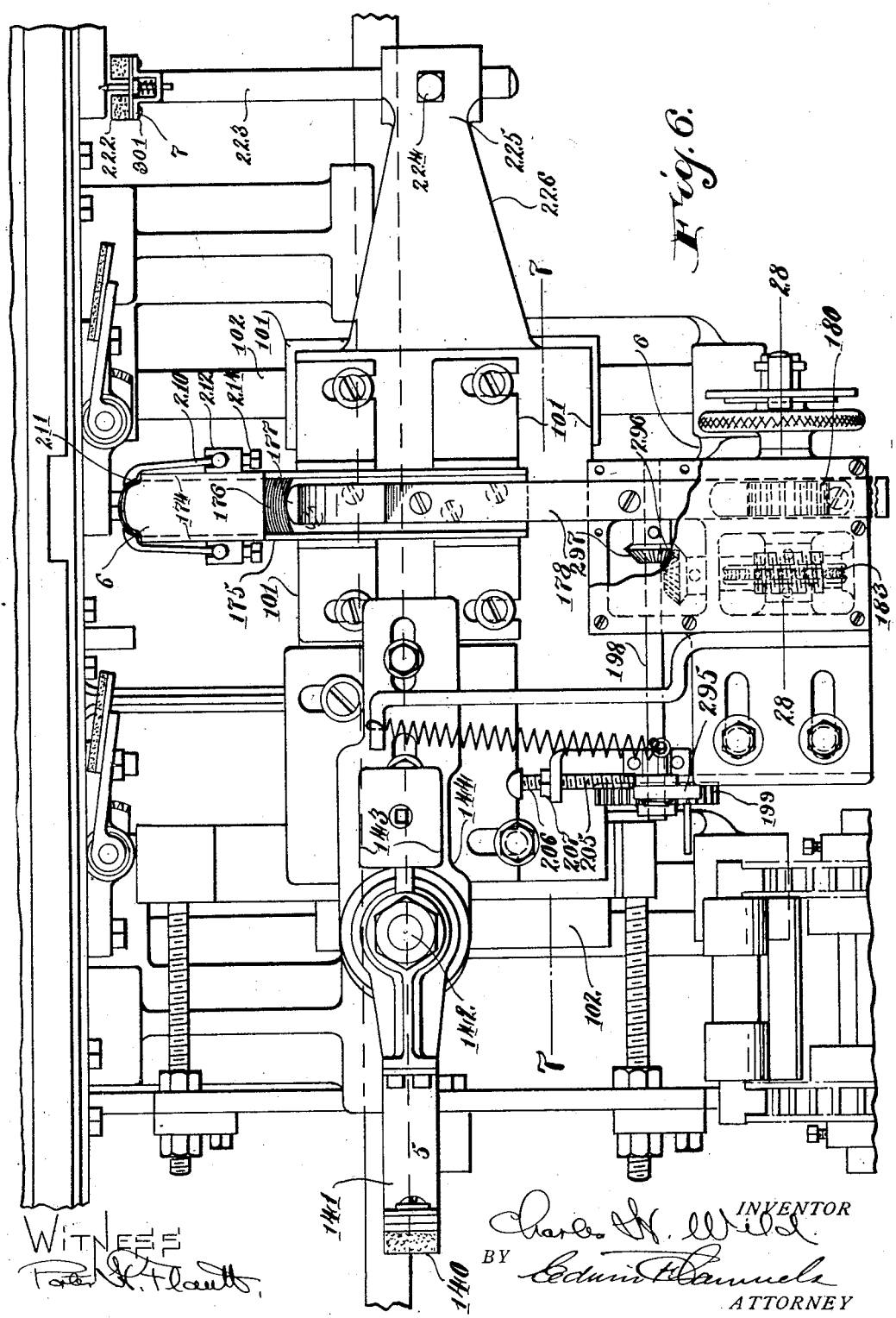

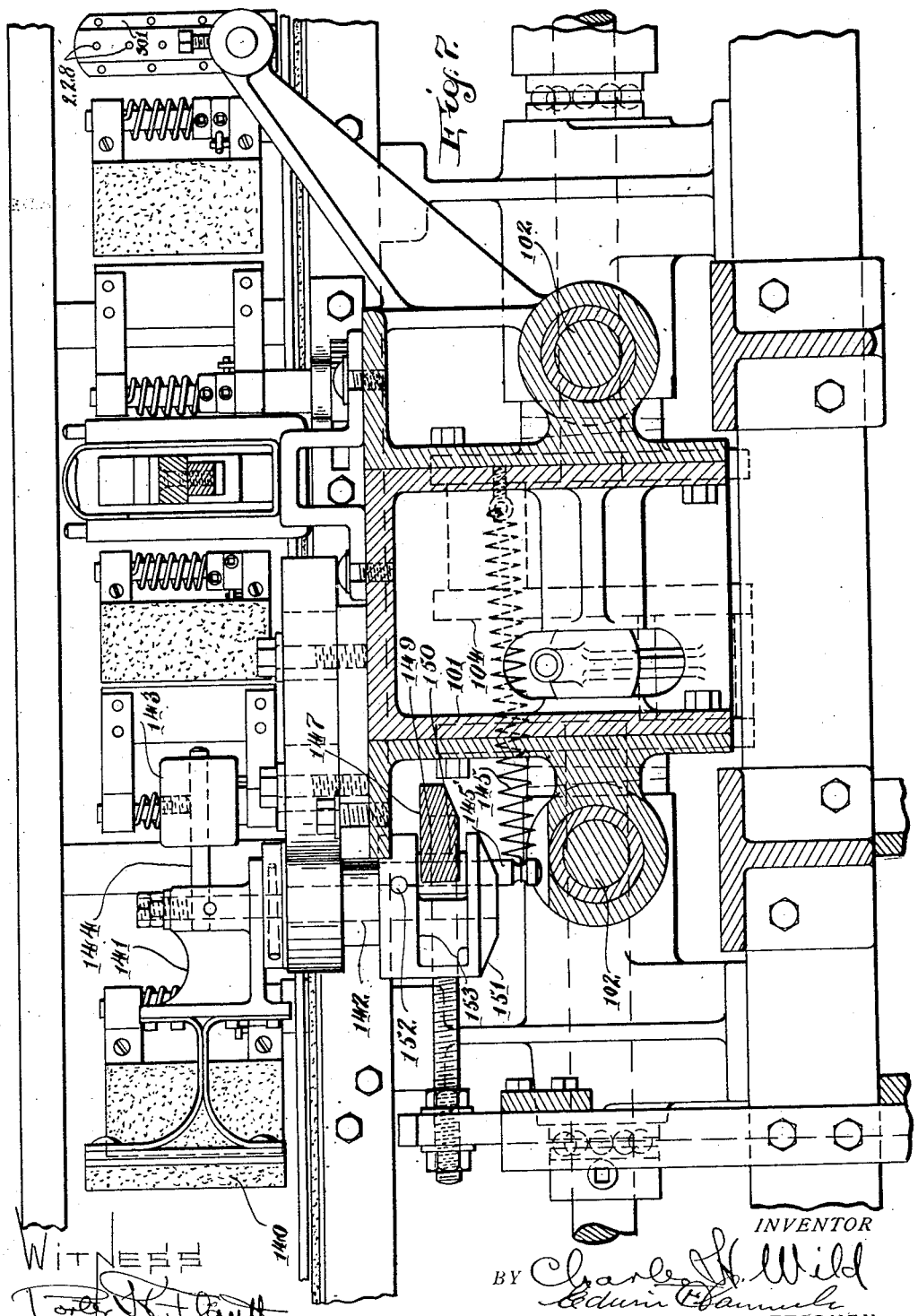

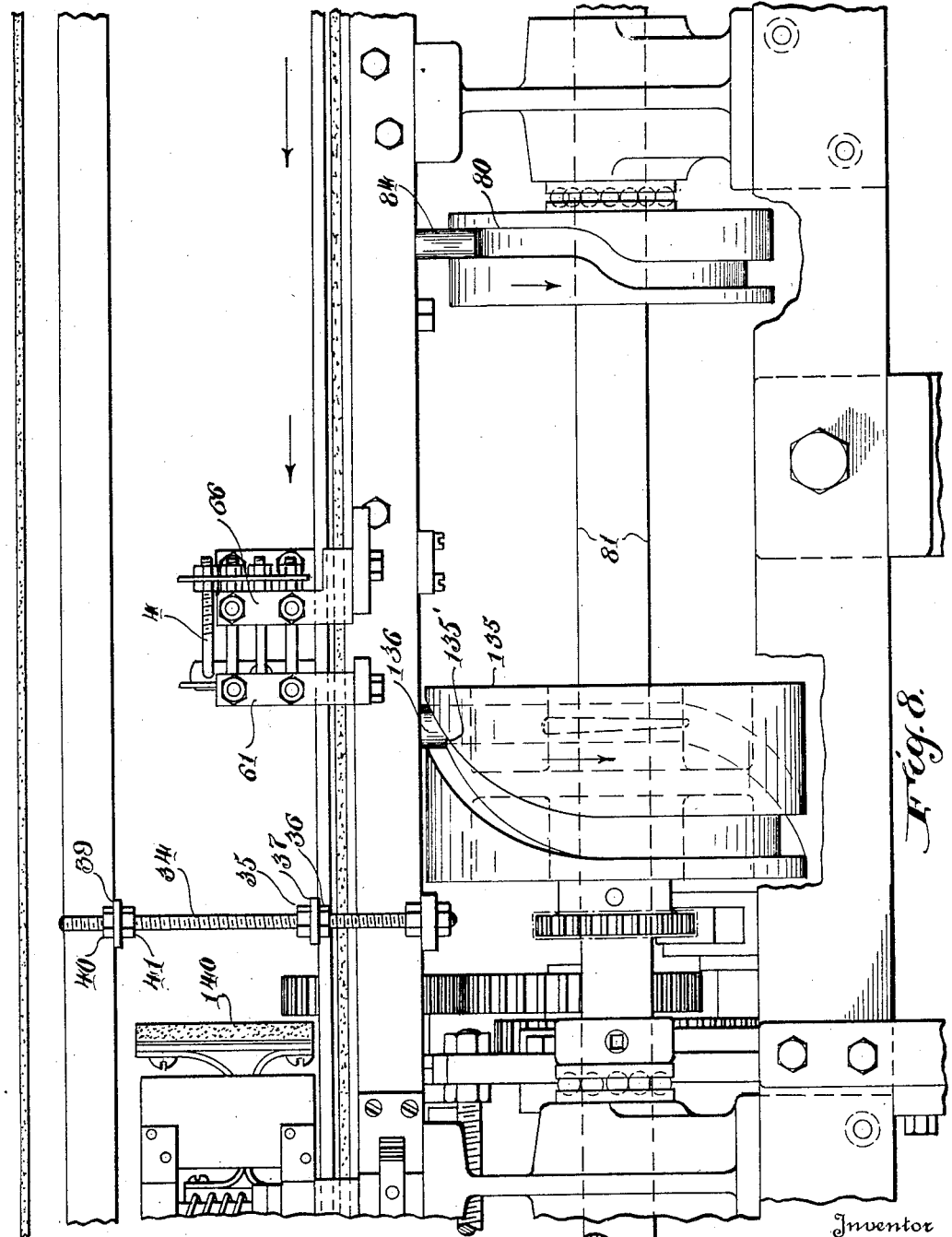

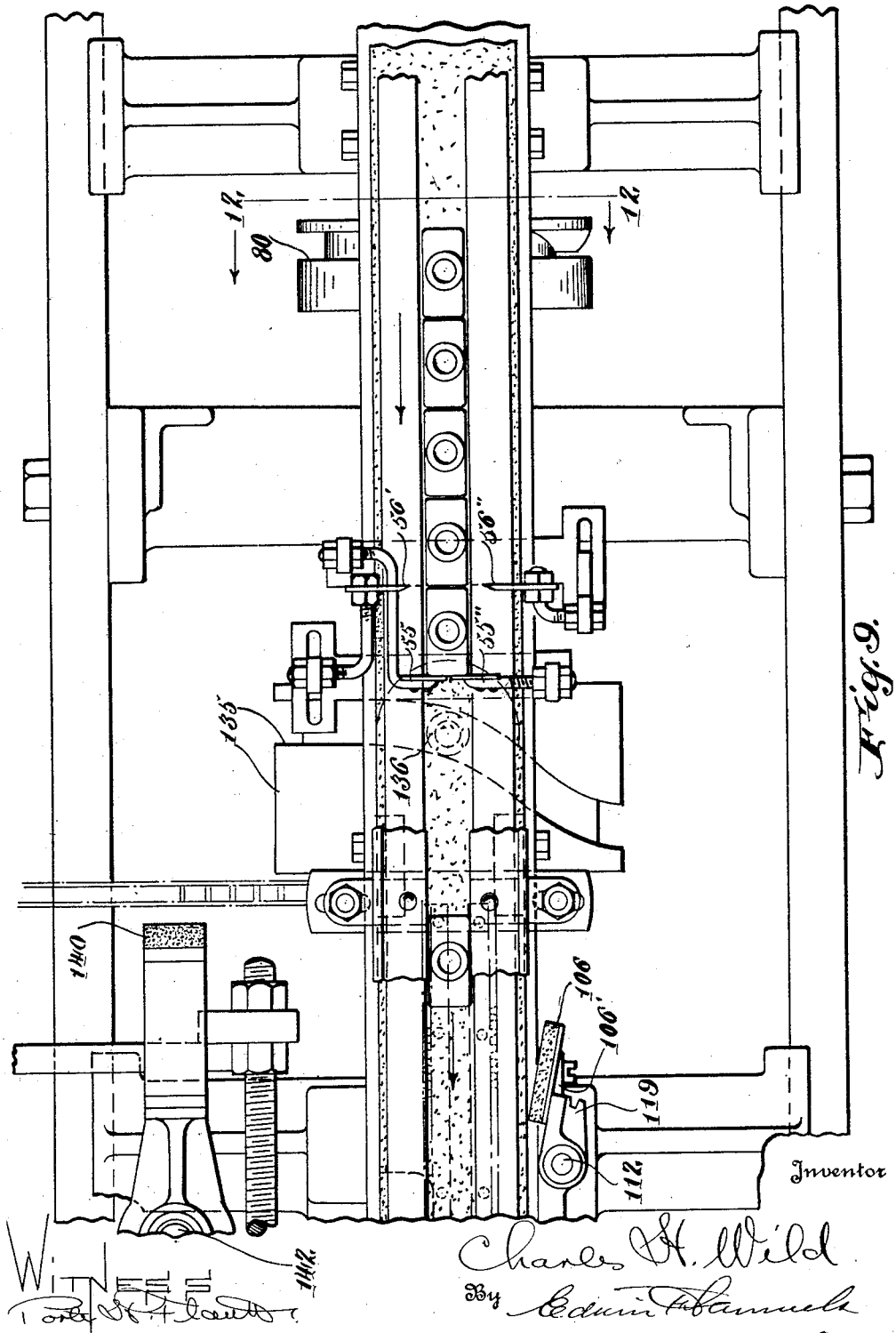

June 14, 1932. C. H. WILD 1,863,176
MACHINE FOR LABELING BOTTLES AND THE LIKE
Filed May 8, 1930 16 Sheets-Sheet 8

June 14, 1932. C. H. WILD 1,863,176
MACHINE FOR LABELING BOTTLES AND THE LIKE
Filed May 8, 1930 16 Sheets-Sheet 9

Inventor
Charles H. Wild
By Edwin H. Samuels
Attorney

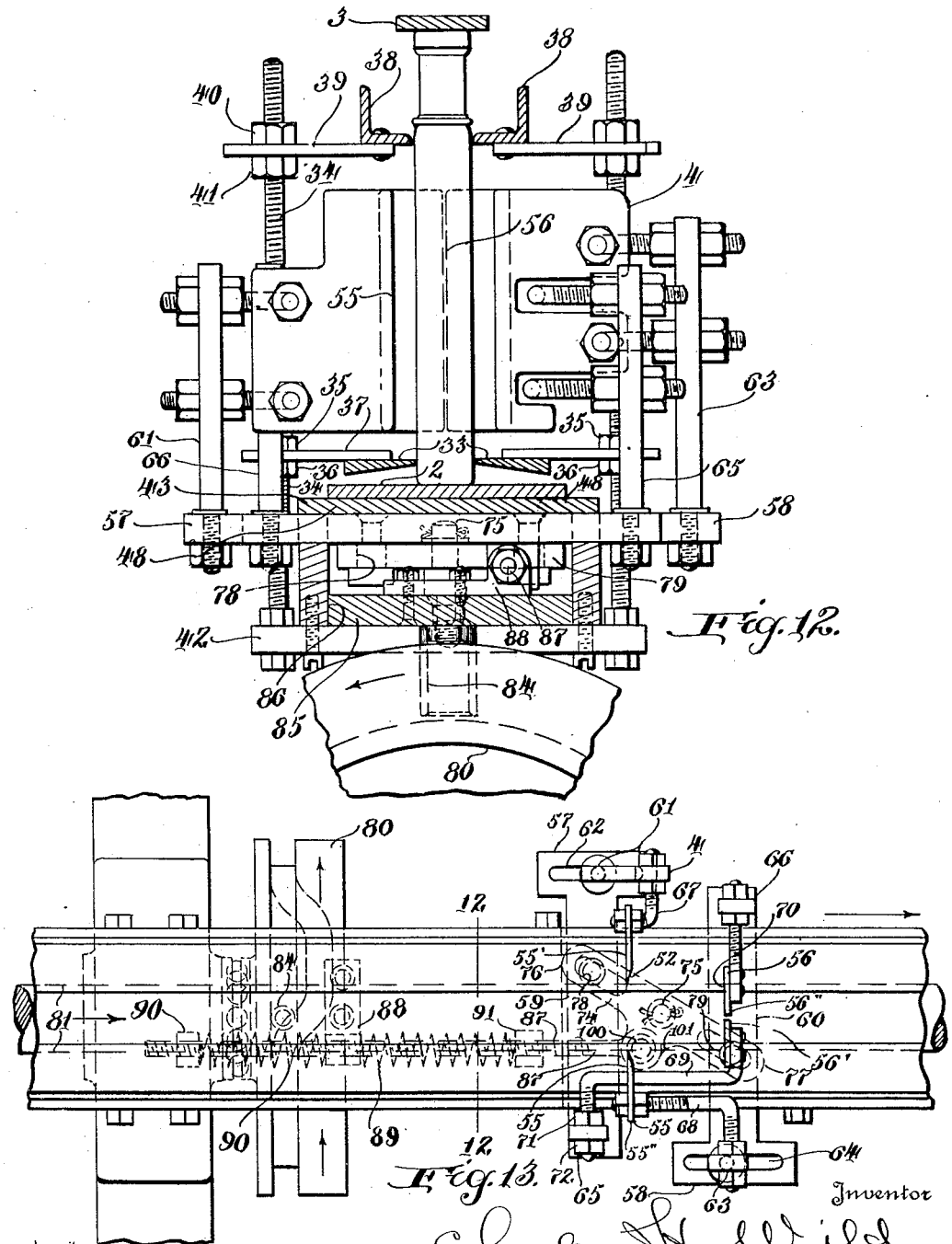

June 14, 1932. C. H. WILD 1,863,176
MACHINE FOR LABELING BOTTLES AND THE LIKE
Filed May 8, 1930 16 Sheets-Sheet 11
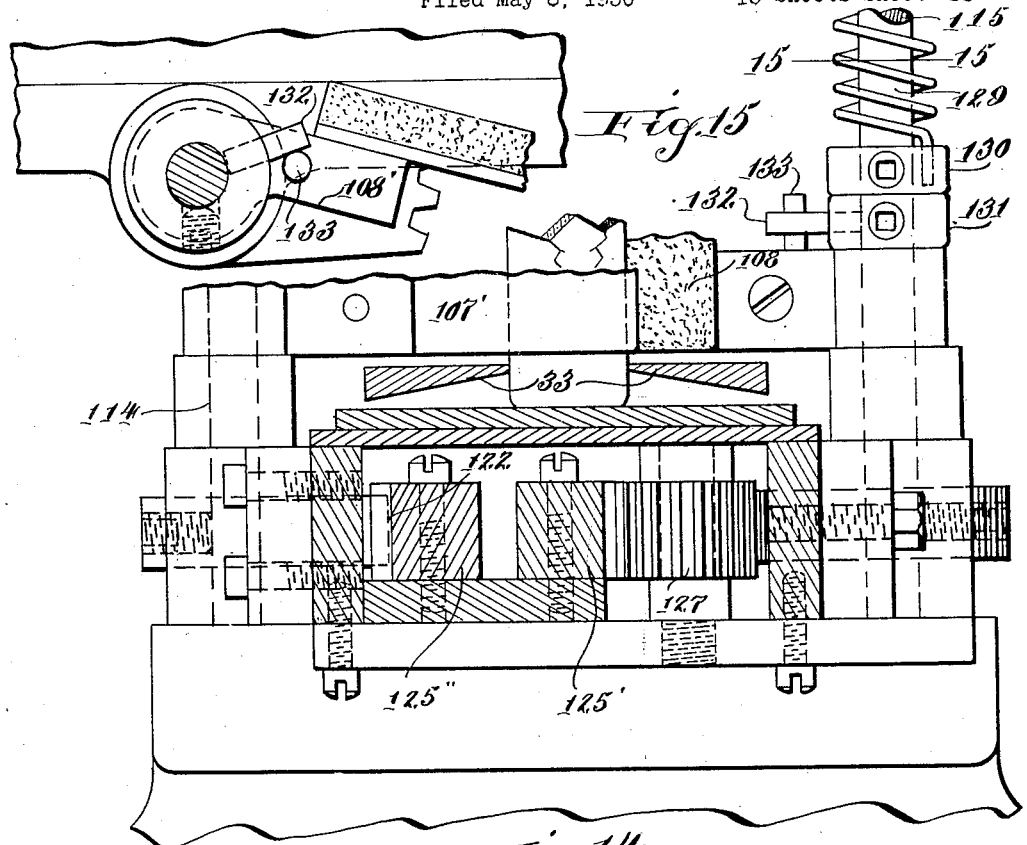
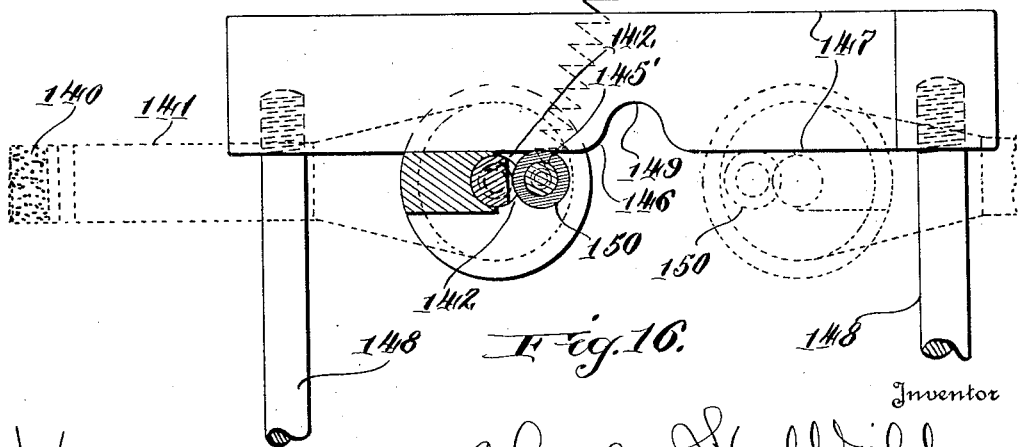

June 14, 1932. C. H. WILD 1,863,176
MACHINE FOR LABELING BOTTLES AND THE LIKE
Filed May 8, 1930 16 Sheets-Sheet 12
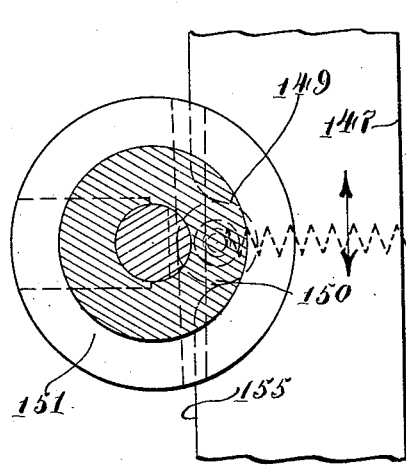
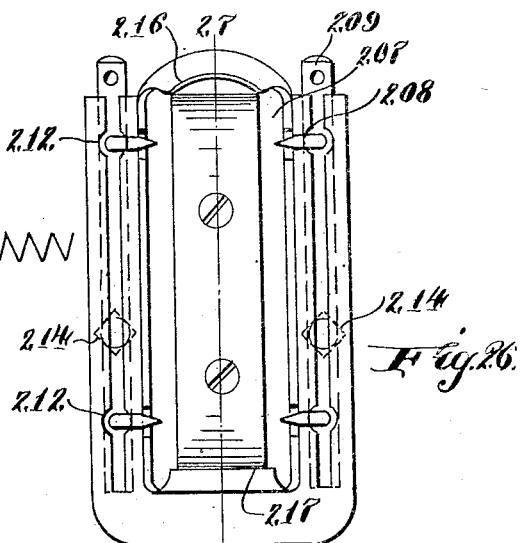
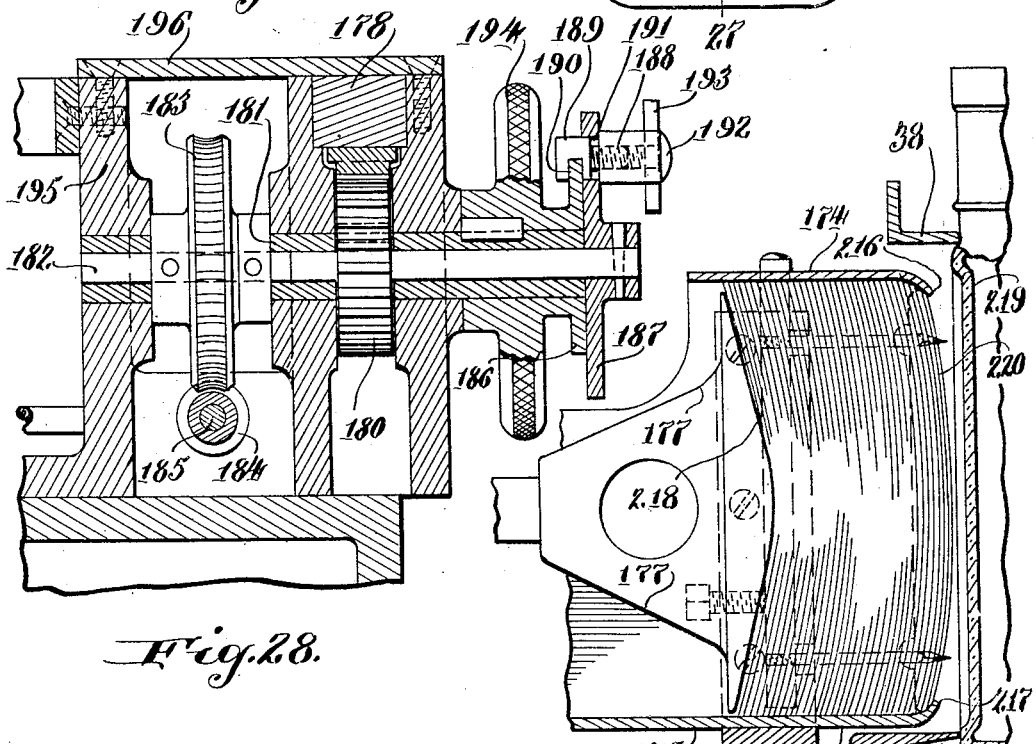

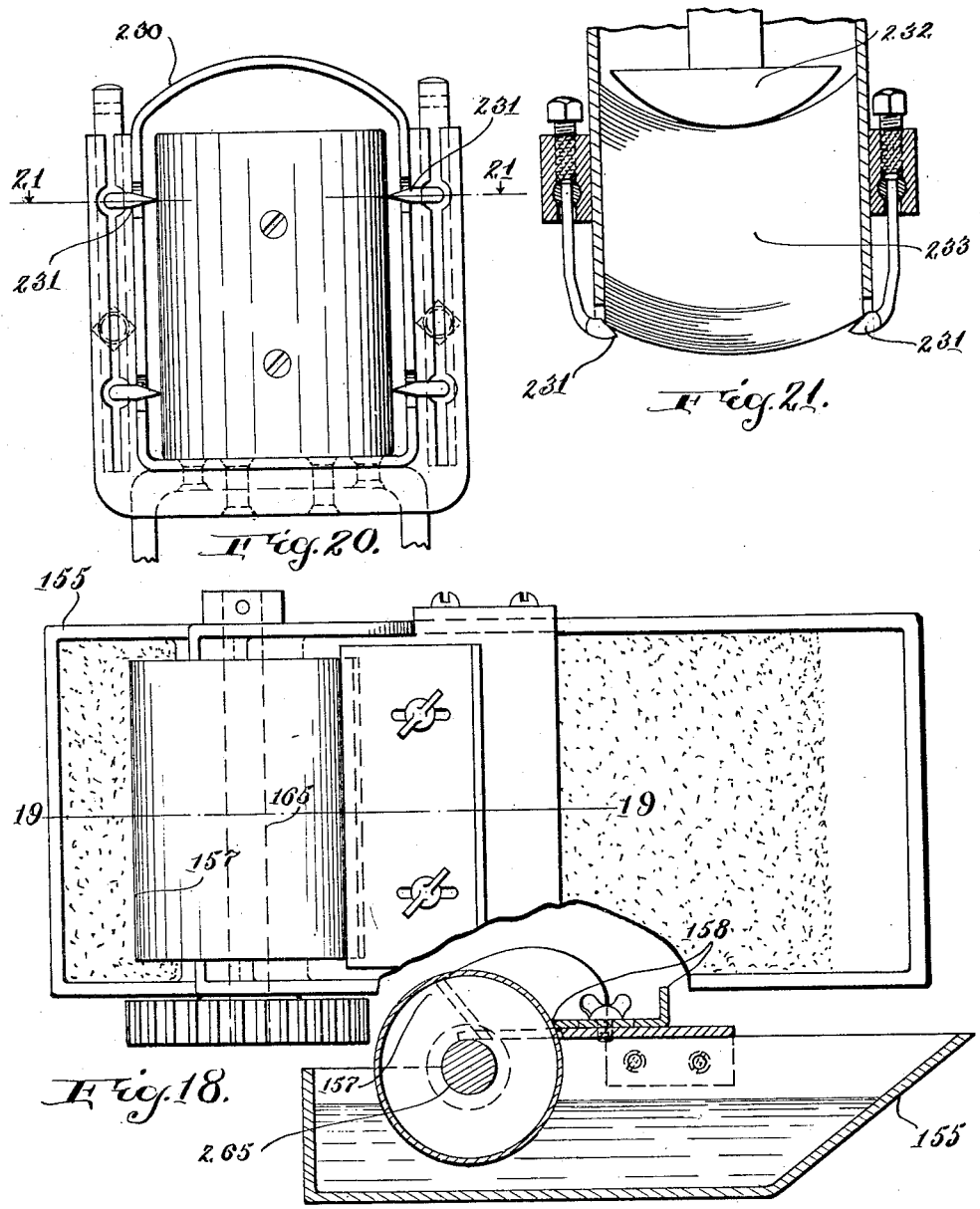

June 14, 1932.  C. H. WILD  1,863,176
MACHINE FOR LABELING BOTTLES AND THE LIKE
Filed May 8, 1930   16 Sheets-Sheet 14

Inventor
Charles H. Wild
By Edwin Samuels
Attorney

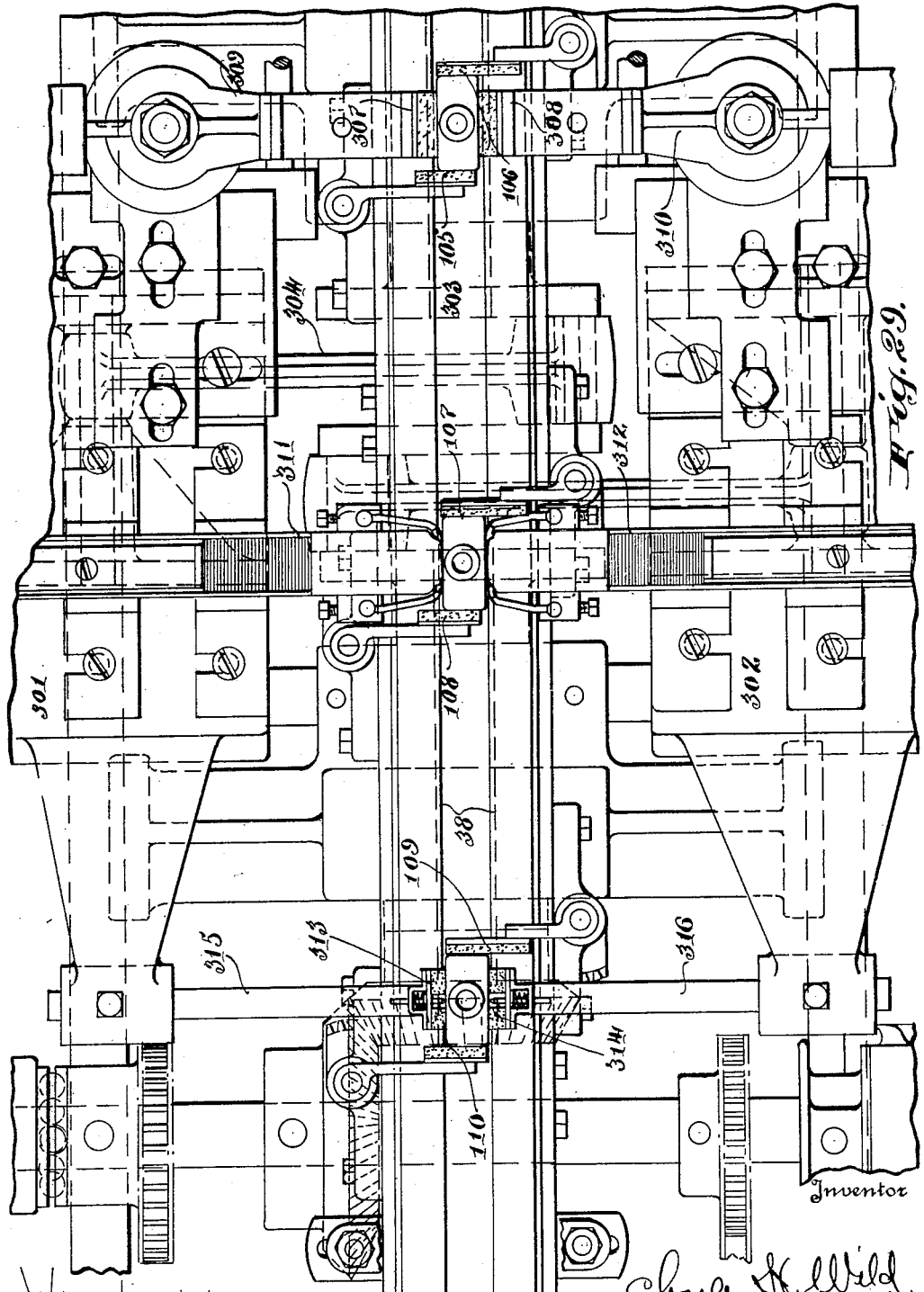

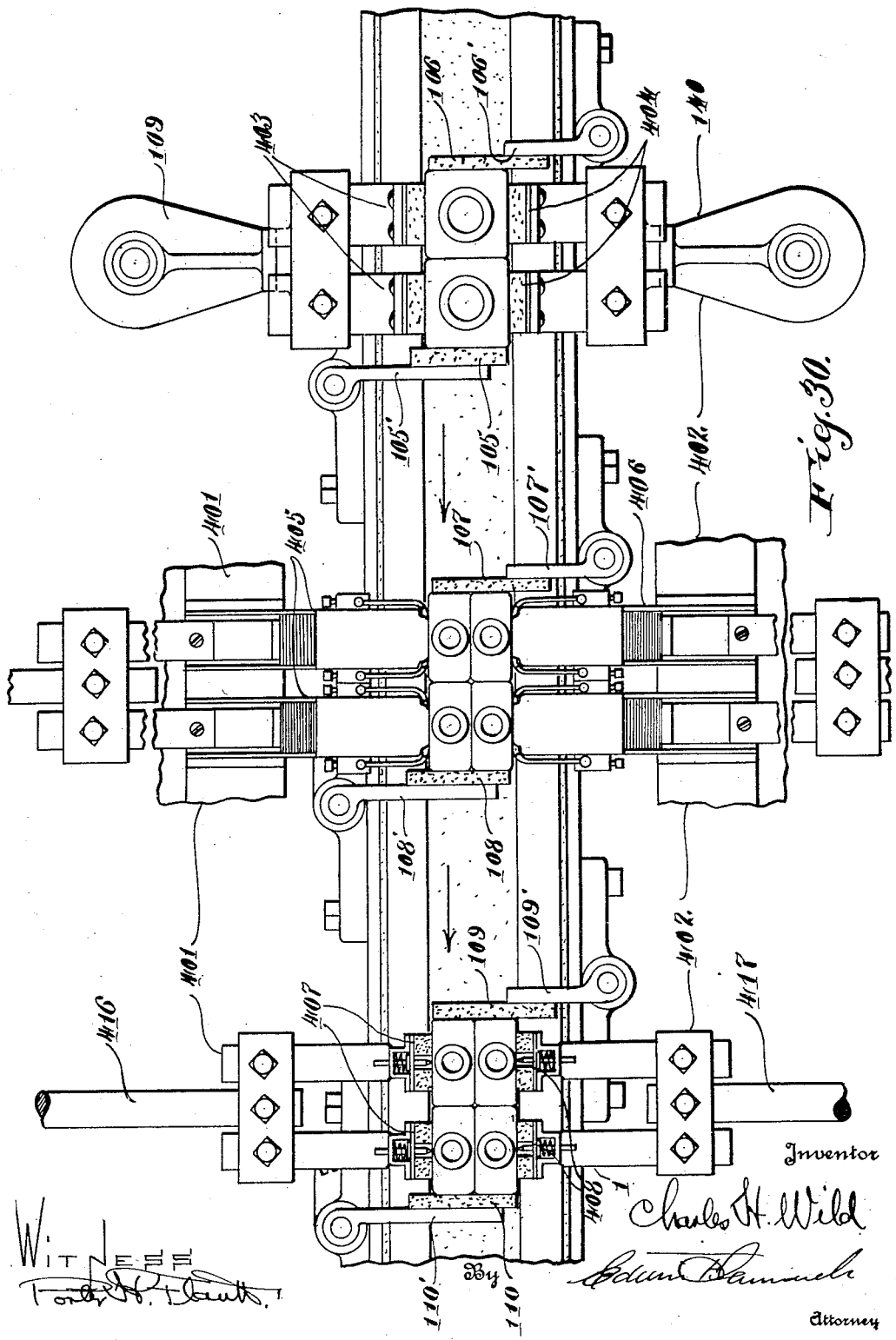

Patented June 14, 1932

1,863,176

UNITED STATES PATENT OFFICE

CHARLES H. WILD, OF BALTIMORE, MARYLAND, ASSIGNOR TO BURT MACHINE COMPANY, INCORPORATED, OF BALTIMORE, MARYLAND, A CORPORATION OF MARYLAND

MACHINE FOR LABELING BOTTLES AND THE LIKE

Application filed May 8, 1930. Serial No. 450,725.

In the application of labels to bottles and similar containers by means of automatic machines, various difficulties have been encountered.

The object of the invention is to overcome these difficulties and to improve the construction and operation of the various features and mechanisms of which the machines of this type are composed and to produce a machine of increased efficiency.

The majority of the machines spot the bottle with paste at spaced points suitably located in regard to the pattern, size and intended position of the labels which it is desired to apply, and it is exceedingly difficult or impossible to so alter the machine that labels of any widely different size or shape can be used and to adapt the machine to the labeling of bottles of different sizes and shapes.

Also, in these previous machines on account of the manner of applying the paste and particularly on account of the quantity and consistency of the paste used, which has the effect of moistening the labels, and on account of the impounding of air between the label and the bottle surface, and for other reasons it is difficult, if not impossible to give the finished product a neat and pleasing appearance.

Another difficulty is due to the tendency of the labels to slide and become displaced, and therefore, to be irregularly applied due to the action of the pressing mechanism which engages the labels after they are affixed to the bottles.

In the operation of the present machine the paste is applied by means of a single dauber or pad, the paste coated area corresponding exactly to the size and shape of the dauber. It is therefore feasible if any change in the pattern of the label is desirable, to merely change the pad or dauber, using one of the desired shape.

Further, the application of the paste, the application of the labels and the pressing of the labels in position are accomplished by so uniform and positive pressure, that a thin coating of paste containing very little moisture or fluid element can be used so that there is very little tendency to moisten the label.

Another advantage of the present machine is that the entire area of the bottle to be covered by the label is paste coated so that the label is pasted at all points and when pressed in position in accordance with the operation of the present machine there is no tendency to wrinkle or pucker as there is no chance for the impounding of air.

The present machine also includes means whereby the tendency of the label to slip during the pressing operation is completely overcome and on account of the improved design and construction of the machine the speed of operation has been increased to 60 or 70 a minute handling the bottles single and to a considerably greater speed where the bottles are handled in groups as described in connection with one form of the invention.

By various groupings of the mechanism of the invention as disclosed, the machine labels one bottle at a time on one side, one bottle on two sides, two bottles each on one side, two bottles on two sides or four bottles each on one side giving greatly increased efficiency.

In the accompanying drawings I have illustrated a machine embodying the invention in the preferred form.

In the drawings:

Figure 1 is an elevation looking at the machine from the right hand side and showing the front end only i. e. the end at which the machine is fed, the rear or delivery end being broken away for convenience of illustration.

Figure 2 is an elevation of the rear or delivery end of the machine which is broken away in Figure 1.

Figure 3 is a fragmentary elevation on larger scale showing the right hand or delivery end of the feed trough at the front of the machine and the adjacent portions of the cooperating members.

Figure 4 is a section on the larger scale transverse to the feed taken on the line 4, 4 in Figure 1, looking to the right or forward.

Figure 5 is a horizontal section on the larger scale and on the line 5, 5 in Figure 1.

Figure 6 is a top plan large scale view of the reciprocating carriage shown in section in Figure 5.

Figure 7 is a vertical section on the same scale and on the line 7, 7 in Figure 6.

Figure 8 is a fragmentary elevation on a larger scale of the portion of the machine just beyond the front end in the direction of the feed taken from the left hand side of the machine, i. e., the opposite side to that shown in Figure 1. The location of the view is indicated by lines 8, 8 in Figure 1.

Figure 9 is a top plan view on the same scale of the portion of the machine shown in Figure 8, the direction of the feed being toward the left in both Figures 8 and 9.

Figure 12 is a section on the line 12, 12 in Figure 9 looking in the direction of the arrows, which is also the direction of the feed, the scale of the figure being larger than that of Figure 9.

Figure 13 is a top plan view of the gates shown in Figure 12 and the mechanism for operating the same, the figure being on a reduced scale is compared to Figure 12.

Figure 14 is a section transverse to the feed and on an enlarged scale, the same being taken on the line 14, 14 in Figure 11 looking to the observer's left.

Figure 15 is a fragmentary section on the line 15, 15 in Figure 14.

Figure 16 is a fragmentary section on the line 16, 16 Figure 4, showing the paste dauber operating cam and follower, the horizontal projection of the paste dauber arm which is actually above the plane of the section being indicated in dotted lines.

Figure 17 is a fragmentary plan showing the paste dauber cam and the follower, the latter being in the cam notch.

Figure 18 is a plan of the paste pot.

Figure 19 is a section through the paste pot on the line 19, 19 of Figure 18.

Figure 20 is an end elevation looking at a label feed box of one type from the delivery end.

Figure 21 is a fragmentary horizontal section through the same on the line 21, 21 of Figure 20.

Figure 26 is an elevation of the delivery end of a feed box handling the long narrow type of labels as shown in Figure 24.

Figure 27 is a section on the line 27, 27 of Figure 26 showing the label pack, the feed pack, the feed box and the pusher.

Figure 28 is a vertical section on the line 28, 28 in Figure 6.

Figure 29 is a fragmentary top plan view of the label applying elements showing alternative arrangement of the machine which is adapted to apply labels to both sides of each bottle simultaneously, the bottles being fed and handled in turn.

Figure 30 is a corresponding view of a machine of this general type arranged to apply one label to one side of each of four bottles simultaneously, the bottles being fed in groups of four at a time.

Figure 10:
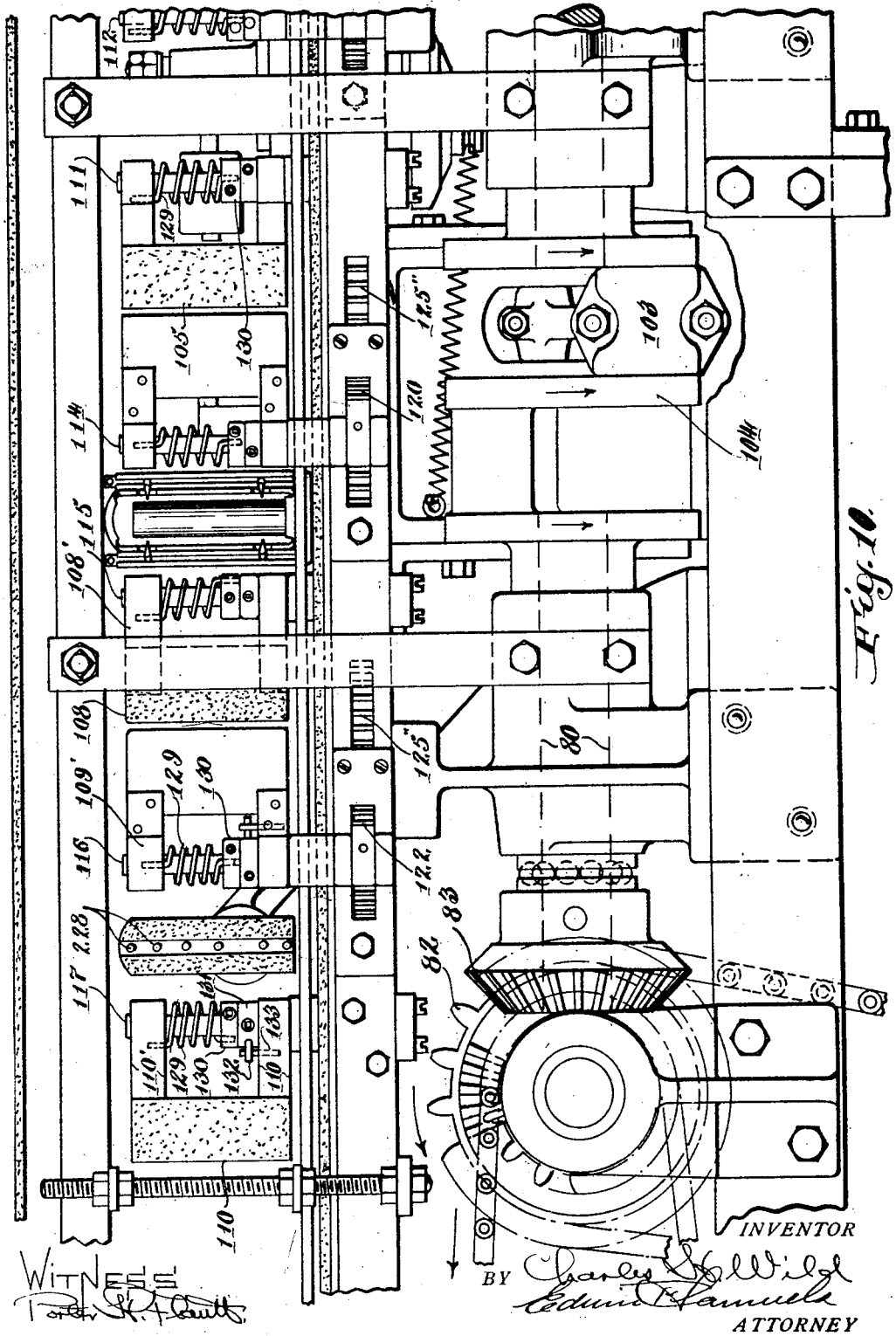
Figure 10 is an elevation looking at the machine from the left in Figure 4 showing the opposite side of the machine from that shown in Figures 1 and 2, the portion shown being just beyond, in the direction of the feed, the portion shown in Figures 8 and 9.

Referring to the drawings by numerals, each of which is used to indicate the same or similar parts in the different figures, the machine as shown comprises a frame 1, carrying the main belt 2, which supports the bottles and carries them through the machine, the passage of the bottles being assisted, particularly in the case of tall bottles, by the upper feed belt 3. The machine also comprises spacing or releasing mechanism 4, by which the spacing or rate of feeding bottles to the pasting mechanism 5, label feeding and applying mechanism 6, and label pressing means 7 is regulated.

The feed belts 3, 4 are in the form of the invention shown driven from the rear end of the machine, see Figures 1 and 2, by means of an electric motor 10, connected at the will of the operator by means of a clutch 11 controlled by a clutch lever 12 to a worm 14 which meshes with a worm wheel 15. This worm wheel 15 in turn carries a small sprocket 16 rotating about the same center. This sprocket 16 drives a chain 17, which engages and drives a sprocket 18 which, in turn, carries a sprocket 19 which drives a chain 23, which passes over and drives a sprocket 20 shown at the rear of the machine. This sprocket carries on the shaft therewith a large pulley 21 which engages and drives the lower or main feed belt 2. The shaft 22 to which the sprocket 20 is secured, also carries a pulley 24 which drives a crossed belt 25 which passes over and engages a pulley 26 on a traverse shaft 27 at the top of the machine at the rear end. This shaft 27 carries secured thereto a larger pulley 28 which drives the top feed belt 3. The main or lower feed belt 2 passes over and is carried at the front end by a pulley 29, and the top belt 3 is carried at the front end of the machine by a pulley 30.

Referring now to the cross sections, Figures 4, 12 and 15, particularly Figure 12, it will be noted that the bottles are guided at the top and bottom by bottom guide strips 33, 33, on each side of the bottle, suitably supported on threaded uprights 34, being secured by means of nuts 35 and 36 above and below the arms or plates 37, which carry the bottom guide strips.

The upper or top guide rails 38, Figure 12, are shown as of angular cross section. They are supported on the threaded uprights 34, by means of narrow transverse strips or plates 39 secured to the studs 34 by means of nuts 40 above and 41 below the strips 39, it being understood that the uprights 34 are threaded throughout their length to receive the nuts 35, 36, 40 and 41, which hold the supporting strips 37, 39 for the guides 33, 33, 38, 38. The studs 34 are supported at the bottom on transverse bars 42 secured to the table 43, which extends almost the entire length of the machine.

The top traverse of the bottom belt 2 rests and slides on the table 43 so that it carries the weight of the bottles as they are fed through the machine, it being understood that the bottles are fed between the top traverse of the bottom belt and the bottom traverse of the top belt. The top portion of the bottom belt is preferably supported by the table 43 throughout almost its entire length, see Figures 1 and 2, as well as Figure 12, as already suggested. The bottles are fed to the belt 2 by hand or in any suitable or preferred manner, a trough 45 being provided at the front or feed end of the machine to hold the bottles to be labeled and line them up for feeding prior to transferring them to the belt.

The bottom guide rails 33 begin at the front of the machine immediately adjacent the delivery end of the trough 45, see Figure 3, and the bottom of the trough as shown is formed of a thin metal plate 46, which projects from the trough in the direction of the feed which is to the right in Figures 1 and 3, the trough bottom 46 as it projects forwardly from the trough approaching and coming in contact, particularly at its forward end at 47 with the bottom feed belt 2. The top plate 48 of the table 43 as shown is deflected downwardly at the front of the machine adjacent the top of the pulley 29, and the depressed forward end of this plate 48 underlies and contacts and receives the lower feed belt 3 at a point just beneath the delivery end portion of the trough bottom 46.

In feeding the bottles to the machine, Figures 1 to 28, they are lined up in the trough 45 with the sides which are to receive the labels at the right of the operator facing the machine and toward the observer in Figure 1, the trough being of a width adapting it to fit the transverse dimension of the bottles, i. e., at right angles to he surface which receives the labels of the bottles being treated. To this end the troughs are made interchangeable or adjustable in width, bolts 45 fitting in suitable transverse slots.

In feeding, the trough being filled with bottles or containing bottles which are lined up, each in contact with the one next forward in the direction of feed, these bottles are gradually pushed forwardly until those at the front of the column pass in the direction of feed over the end 47 of the trough bottom plate 46, contacting at this time both the lower and upper feed belt, though the latter is not always regarded as necessary. It will be observed that the end 47 of the trough bottom 46 is just below the bottom horizontal tangent joint of the top belt pulley 30 so that the bottles are when both belts are used, engaged simultaneously at the top and bottom by top belt 3 and bottom belt 2. The bottles as they move forward are checked by the action of the spacing or releasing mechanism 4, which releases at suitable intervals thus spaced, the bottles which have been fed and which are lined up on the feed belt awaiting their turn, each bottle as it comes to the foremost position being at the proper time released and permitted to pass along the belt to the pasting and other labeling mechanisms. The spacing and releasing mechanism is so timed in relation to the belt, that it releases the bottles one at a time or by twos or in groups as described in connection with the other forms of the machine, Figures 29 and 30, at suitable intervals depending upon the speed of the belt or belts and thus spaces them apart by a distance corresponding to the spacing of the pasting mechanism, the label feeding and affixing mechanism and pressing mechanism respectively.

This spacing or releasing mechanism 4 is more fully illustrated in Figures 12 and 13. It consists primarily of cut off gates 44 and stop and spacing gates 56. To support and operate these gates, the machine is provided with two oppositely moving transverse slides 57, 58, which move in transverse ways 59, 60, formed in the table 43 beneath the table top 48. The slide 58 is beyond the slide 57 in the direction of the feed. The slide 57 carries one of the cutoff gates 55' and one of the stop and releasing gates 56' and the slide 58 carries the other cutoff gate 55'' and the other releasing gate 56''. The cutoff gates 55 are carried respectively by upright 61 mounted in a fore and aft slot 62 in one end of the slide 57 and by an upright 63 mounted in a slot 64 in the opposite end of the slide 58.

The releasing and spacing gates 56 and 56' are carried by the upright stud 65 in the opposite end of the slide 57 from the stud 61 already referred to and by the upright stud 66 in the end of the slide 58 opposite to that carrying the stud 63. The gates are supported on suitable threaded arms 67, 68, 69, 70 and are made adjustable at right angles to the feed by means of suitable abutment and lock nuts 71, 72 on each side of the respective uprights 61, 63, 65, 66. The arms 67, 68, 69, 70 are straight or offset as the function of each as described requires, and as shown in plan, Figure 13. The respective pairs of cutoff gates and stop and spacing gates 55, 56 are operated simultaneously, and the respective pairs oppositely by means of said slides which are moved oppositely and simultaneously by means of a double crank 74. This crank is pivotally mounted at 75 on the table and is provided with two oppositely projecting arms 76, 77, which are slotted in the direction of their length to engage the depending pins 78 and 79 carried by the transverse guides 59 and 60, respectively.

The double crank 74 is operated by means of a cam 80 on the longitudinal shaft 81 which is driven, see Figure 1, by means of bevel gear 82, carried by the sprocket 18 previously described, which bevel gear 82 meshes with a second bevel gear 83 on said longitudinal or cam shaft 81. The cam 80 operates a follower 84, Figure 8, carried by a slide 85 which moves in longitudinal guides 86. This slide 85 operates a spring bolt 87, which slides through a lug 88 on said longitudinal slide. This spring bolt 87 is encircled by helical springs 89, 90, which bear on opposite sides of said lug 88 and on abutments shown in the form of nuts 90 and 91 on said bolt 87, which bolt is threaded to carry the nuts. In this way the operation of the cam as applied to the spring bolt 87 is cushioned, making the action of the gates a yielding one as hereinafter described. The spring bolt 87 is connected to the double crank 74 by means of a crank pin 100 carried on a lug or third crank arm 101. The alternate operation of the slides 57, 58 with the consequent alternate operation of the pairs of gates 55, 56, each slide carrying one of each said gates, as thus described, will be easily understood.

The cutoff gates 55 close as the releasing gates 56 open and vice versa. In this way each bottle in turn is stopped by gates 56 and held until the belt 2 or belts 2 and 3 have moved sufficiently to leave the proper interval between the bottles.

It is of interest to note that the adjacent edges, i. e., the edges toward the center of the ways of the cutoff gates 55 are bevelled at 52 on the side which is forward in the direction of the feed, the object of the bevels being to give these gates 55 a cam action so that as they close and cut off the foremost bottle of the line, they impart to it a forward impulse due to the cam-like incline 52 to cause it to start moving with the belt and eliminate any tendency for the bottle to tip backward. The gates are so timed that gates 56 release as gates 55 close, thus advancing the bottle released and cutting off the line of bottles behind.

As the bottles move through the machine from the releasing and spacing mechanism 4, they are presented to the pasting mechanism 5, the labeling mechanism 6 and the pressing mechanism 7, which mechanisms taken collectively operate simultaneously on three bottles suitably spaced along the belt and ways. To this end these respective mechanisms 5, 6 and 7 are mounted on a carriage 101, which is reciprocated transversely to the belt or ways bringing said mechanisms 5, 6 and 7 into operative relation with the bottles on the ways at the return end of each complete stroke, i. e., as the carriage approaches the ways, and the bottles are spaced along the belt to correspond to the spacing of mechanisms 5, 6 and 7.

This carriage 101 is shown in horizontal section in Figure 5 and in top plan in Figure 6, and vertical section in Figure 7. It is mounted on transverse ways 102 rigidly mounted on the stationary portion of the machine frame and is actuated by a crank pin 103 carried by crank discs 104 on the cam shaft to longitudinal shaft 81. The carriage makes one complete stroke for each bottle or group of bottles fed through the machine, the group feed being later described.

Before discussing the paste coating, labeling and presser mechanisms carried by the carriage 101, it is of interest to note the manner of holding the bottles at each station during the corresponding paste coating, labeling and pressing operations. The bottle holding or clamping mechanism is best understood from the plan view, Figure 11, the position of the observer in said view being opposite to that of the observer in Figure 1, so that the feeding motion is from right to left instead of from left to right as in Figure 1.

At the operating stations the bottles are held by means of clamping pads 105, 106 (see Figure 9) and 107, 108, 109, 110. These clamping members or pads are carried by corresponding clamping arms 105', 106', 108', 109', 110', which swing about upright shafts 111, 112, 114, 115, 116, 117, on each of which shafts 111, 112, 114, 115, 116, 117 is mounted a corresponding toothed arc 118, 119, 120, 121, 122 and 124.

Figure 11:
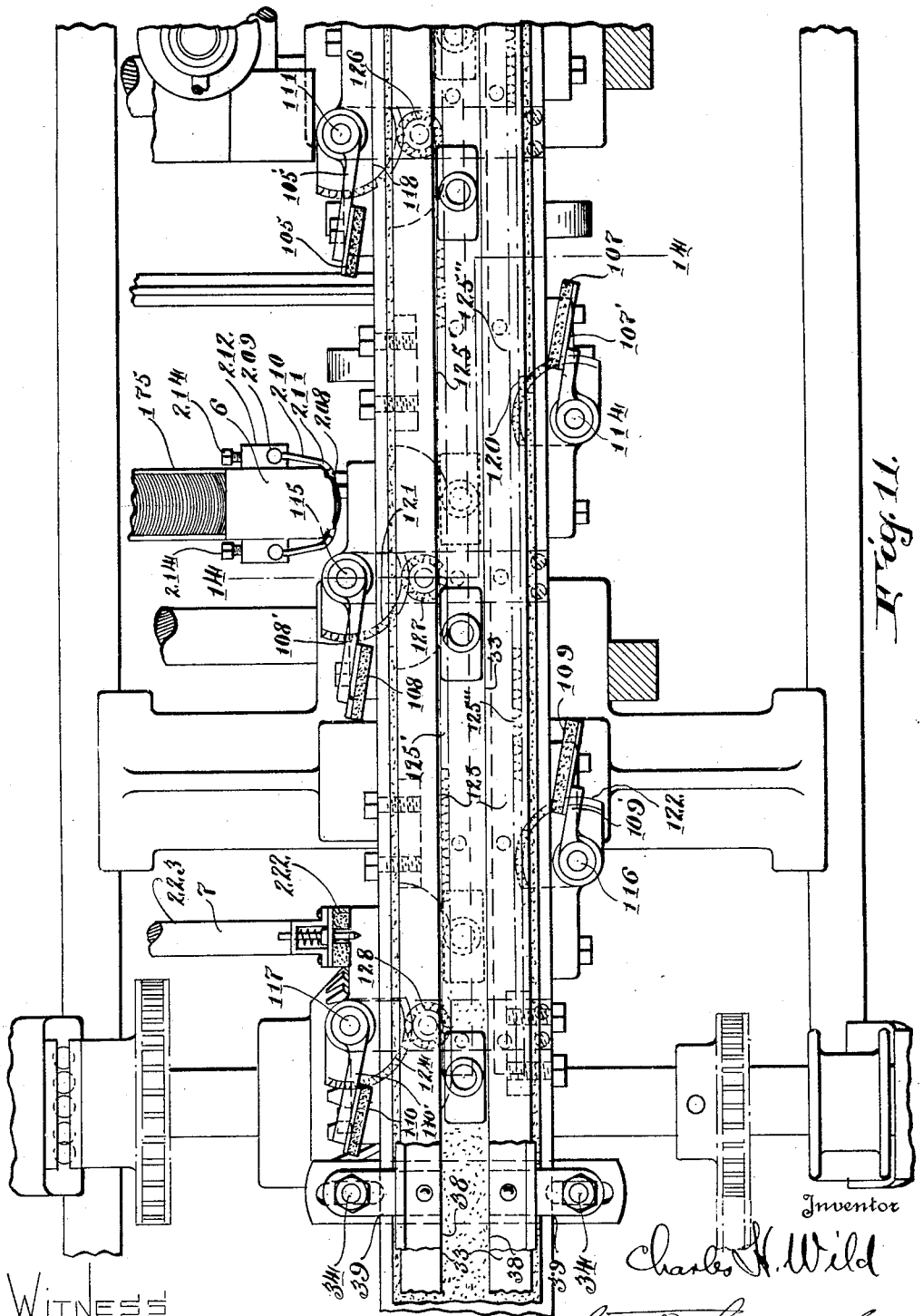
Figure 11 is a top plan view of the portion of the machine shown in Figure 10, the observer being on the side opposite to the side shown in Figures 1 and 2.
Figure 31:
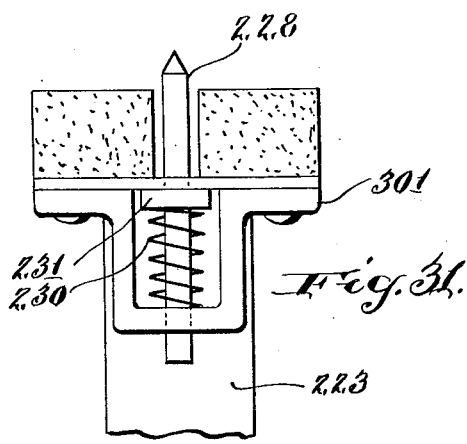
Figures 31 and 32 are detail views of the label pressing pad and centering means.
Figure 32:
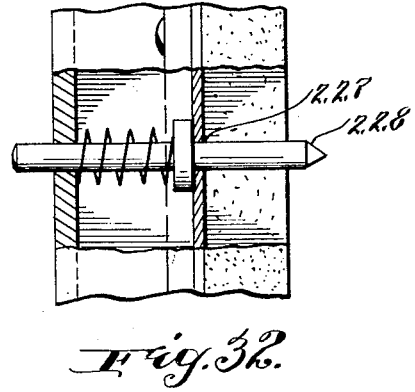

The shafts 111, 112, 114, 115, 116, 117 are oscillated and the bottle engaging pads 105 to 110 are swung through a suitable arc to bring them into engagement with the bottles and return them to the retracted position shown by means of a sliding rack 125, which is best shown in plan, Figure 11. This rack is toothed on both of its side edges 125 and 125″, and slides longitudinally of the machine. The teeth on the side adjacent the observer in Figure 11 engage directly with the teeth of the segments 119, 120, 122 on this side. The toothed segments 118, 121 and 124 on the opposite side of the rack are engaged by intermediate pinions 126, 127 and 128 suitably mounted on the frame of the machine and these pinions in turn engage the rack 125 at 125', imparting to the segments 118, 121, 124, an oscillatory motion which is simultaneous with that of the arcs on the opposite side of the rack and opposite to it. The pads 105 to 110, or more specifically, the arms 105' to 110' are yieldingly connected to the shafts 111 to 116 to swing in the closing direction, which places them transversely of the rack 125 and of the ways 33 and 38 in the preferred form of the machine illustrated by means of coil springs 129 connected at one end to the arms 105', etc. and at the other end to a hub, 130 secured to the corresponding shaft 111, etc. The yielding connection prevents breakage of the bottles. A positive return or opening motion of the bottle clamping mechanism, specifically the pads 105 to 110, is obtained by a positive connection operated in this direction. This consists (see Figures 14 and 15) of a hub 131 secured to each of the shafts 111 to 117, and having a radially projecting finger 132. This finger which swings with the shaft engages in the return operation with an upright pin 133 shown as seated at its lower end in the corresponding arm 105' to 110', carrying the respective pads, the arm shown in Figures 14 and 15 being arm 108'.

The rack 125 is given the reciprocating motion referred to by means of cam 135, having cam path 135', see particularly Figures 8 and 9, which is engaged by follower 136, depending from the rack. The cam 135 is mounted on the shaft 81 just beyond the cam 80 in the direction of the feed. The operation of the bottle clamps whereby the pads move simultaneously into a position transverse to the feed belts, each pair of pads 105, 106, etc. enclosing and holding a bottle in line with the corresponding mechanisms, 6, 7, 8, is apparent and will be further described in connection with the operation. The paste coating label affixing and pressing mechanisms have already been referred to as carried by the reciprocating carriage 101 by which they are brought at the end of the forward stroke into engagement with the bottles, the bottles being clamped at this time by the holding or clamping mechanism 105 to 133, etc. just discussed. The paste pad 140, (see Figures 6, 16 and 17) shown in intermediate position in Figure 6, is carried on an arm 141, which swings about an upright shaft 142, on the carriage 101. The arm and the pad are counterbalanced by a weight 143, Figure 6, carried by arm 144 which is secured to and projects from the shaft 142 in the opposite direction from the pad 140. The tendency for the arms 141 and 144, and pad 140, to seek and remain in the intermediate position shown in Figure 6 is imparted to these members by a tension spring shown in the form of a coil spring 145, connected to an eccentric pin 145' on the arm 144 or otherwise connected to shaft 142. This spring is connected at its opposite end to a suitable point on the carriage 101. See also fragmentary plan, Figure 16. The pasting pad 140, is operated by a stationary notched cam member 146, mounted on the frame of the machine in any suitable manner, as by means of studs 148. This cam member 147 has an intermediate notch or pocket 149, which is engaged in the mid position of the carriage 141 by a roller 150, eccentrically mounted on the shaft 142. This roller may encircle the eccentric pin 145'.

In the form of the invention shown, see particularly Figures 7 and 17, the roller 150 is carried in a horizontally slotted hub 151, which is secured to the shaft 142 by a set screw 152. The slot 153 in the hub 151 receives and partially encloses the notched cam member 147.

It will be noted, Figures 16 and 17, that the cam member 147 extends transversely to the feed, being substantially parallel to the direction of motion of the reciprocating carriage 101.

Having reference to Figure 16, as the carriage 101 advances toward the path of the bottles, the follower 150, see dotted line position in Figure 16, is in advance of the arm 141, which is pointed to the rear, i. e., away from the ways and the bottles thereon. In fact, it has just been brought in contact with the paste plate as hereinafter described. As the carriage further approaches the path of the bottles and carrier belts 2 and 3, and the bottles thereon, the follower 150 impelled by the spring 145 enters the notch or pocket 149. As the carriage 101 further advances, the follower being held in the pocket, causes the arm 141 carrying the paste pad 140 to swing rapidly about the shaft 142 to the forward position which position it assumes prior to the extreme forward end of the carriage stroke. As the carriage 101 completes its advance, the paste pad 140 is thus pressed positively and firmly against the bottle held between pads 105, 106.

On the return stroke the pasting pad 140 and the arm 141, being in the position in which they are shown at the left in Figure 16, the follower 150 against drops into the notch 149, and as the carriage slides toward the rear end of its stroke, the arm 141 is swung quickly about the shaft 142, so that it points transversely to the bottle feed and exactly or almost exactly in the direction in which the carriage is moving, i. e., away from the path of the bottles. At the end of this rearward stroke, the pad is brought into contact with the paste plate to be described and on reversal of the motion of the carriage the operation is repeated.

The paste pot 155 and cooperating parts are mounted on a bracket 156 which projects from the frame to the right as seen in Figure 4. The paste pot 155 is provided with the usual paste pot roller 157, Figure 19, and scraper 158. This roller is driven by means of a sprocket chain 258 which is driven by a sprocket 159 on the longitudinal shaft 80, which chain passes over a guide and tension sprocket 160 and drives a sprocket 161, which carries a toothed gear 162, which, in turn, drives a gear 163, which meshes with a gear 164 secured to the paste pot roller shaft 265. The paste from the paste pot roller 157 is transferred to a plate 170 in the path of the paste pad 140 by means of a travelling paste roller 165, carried on suitable arms 166 attached to a pair of vertically arranged sprocket chains 167, which are carried by the drive sprocket 168 and driven sprocket 169. The lower or drive sprocket 168 is carried by a toothed gear 169 secured to the shaft of said sprocket or to the sprocket itself which, in turn, is driven by a large gear 262 carried by gear 163 in the paste roll drive.

The paste plate 170 is shown as mounted in a vertical position at the extreme end of the path of the paste pad 140 and in and parallel to the path of the paste roller 165. This paste roller is carried by the chain in right handed traverse, as indicated by the arrow, Figure 4, so that it passes downwardly in contact with the paste pot roller 157, which carries a coat of paste, the thickness of which is regulated by an adjustable scraper 158. so that the paste roller 165 removes a little of the paste from the roller 157, at each traverse and carries it along the path of the endless chains 167, which chain passes behind the plate 170, which is curved inwardly at 171 at its lower end and at 172, at its upper end almost into contact with the chain, so that the carrying arm 166, projecting outwardly, the plate passes between the arms and also between the roller 165 and the chains 167. In this way the paste roller 165 is passed first in contact with the paste pot roll 157 and then in contact with the plate 170, giving the latter a thin coating of paste which is maintained throughout the operation of the machine.

It will thus be understood that the arm 141 carrying the paste pad 140 and being swung through an arc of 180 degrees on each traverse of the carriage 101, the arc being completed before the end of each traverse or half stroke, the swing being in the direction of motion of the carriage in each instance, the paste pot is first thrust backwardly against the paste plate 170, thinly coated with paste and then swung forwardly and at the end of the swing and near the end of the forward stroke or traverse thrust forwardly against a bottle on the ways held in position to receive the paste pad, the holding means in this instance being the bottle holding or clamping pads 105, 106, at the right of Figure 29, which it will be understood is arranged oppositely to the elevation in Figure 1.

The operating unit next in order of arrangement, which is the direction of the feed, is the label affixing mechanism which includes the label trough or rack 175—see Figures 6, 11, 26, 27 and 28. The labels 176 in the rack or trough 165 receive a positive forward thrust from the pusher or plunger 177. The forward end of the trough is closed at the top by suitable cover or top 174 to be further described. The plunger 177 is mounted on a rack bar 178 which extends toward the observer in Figure 6, and to the right in Figure 4. This rack is provided with teeth 179 on its bottom side, which teeth are engaged by the pinion 180—see Figure 6 and Figure 28, which pinion is mounted on a sleeve 181 which is, in turn, mounted on a worm wheel shaft 182 which is driven by a worm wheel 183 from a worm 184 on the worm shaft 185. The sleeve 181 is integral with or secured at its right hand end to a disc 186 which is in close contact with a disc 187 secured to the corresponding end of the shaft 182. Any convenient means may be provided for connecting the discs 186 and 187 together and releasing them. In the form of the invention shown, this means consists of a bolt 188 having a head 189 suitably slotted at 190 to receive the edge of the disc 186. The head 198 is mounted in a suitable aperture 191 in the disc 187 but the head 189 only extends part way through said aperture 191 in disc 187, and the threaded end of the bolt 186 projects from the disc 187 on the side opposite the disc 186 and this projecting end is engaged by a nut 192, or any suitable nut which may have wings 193 for convenience in turning by hand. This nut rests at the sides of the bolt 188 on the surface of the disc 187, and when this nut is tightened it secures the discs in close relation to each other so that there is no relative rotation. In this way the pinion 180 is connected to the shaft 182 to rotate therewith. This provides for the feeding of the pusher 197 with a consequent positive advance of the labels from the power drive of the machine.

In case it becomes desirable to move the label pusher by hand as in withdrawing it for the admission of a new supply of labels or to advance it into contact with the labels the worm 184 would prevent a hand operation of the feed. To provide for hand operation of the plunger, means has been provided for disconnecting the discs 186, 187, permitting the rack 178 to be moved by hand. To this end the sleeve 181 is provided with a hand wheel 194, and by slightly unscrewing the nut 192, the discs 186, 187 are released and the rack 178 and hence the label pusher 177 are moved at the will of the operator. This hand operation may be utilized for the admission of labels and for moving the labels to operative position by means of the hand wheel 194.

In this connection, it is of interest that the parts 178, 180, 181, 183, etc. are enclosed within a housing 195, Figure 28, having a removable cover 196, which is broken away in Figure 6 for convenience of illustration.

The worm 184 which drives the worm wheel 183 and hence the rack 178 and the pusher 177, is mounted on the worm shaft 185. This shaft carries a bevelled gear 296 which meshes with a second bevelled gear 197 mounted on a longitudinal shaft 198, all of which members are carried by the reciprocating carriage 101 previously discussed. The shaft 198, in turn, carries a ratchet wheel 199, see Figure 4, which is engaged by a pawl 295, mounted on a swinging arm 200 which, in turn, is pivotally mounted on the shaft 198 and free to swing relatively thereto at a point intermediate of its length. This arm receives a tendency to left handed rotation or rocking by means of a tension spring 201 secured at one end to said pawl arm 200, and at the other end to a suitable point on the carriage. The pawl arm 200 as shown in normal position projects vertically upward above the shaft 198. It also includes a depending portion 202, provided at its lower end with a foot 203 which bears against a suitable abutment 204 on the frame, being held in this position by the action of the spring 201.

The operation of the pawl is as follows: When the carriage 101 moves to the left, as seen in Figure 4, i. e., advances toward the bottles, the pawl arm 200 actuated by the tension of the spring 201 as the carriage 101 recedes from abutment 204 permitting foot 203 to move, swings about the shaft 198 in left handed rotation, the end of the swing being determined by the adjustable stop 205 on the carriage provided for this purpose. The stop in the form of the invention shown consists of a screw bolt 206 threaded through a suitable aperture in the frame and held in adjusted position by lock nuts 207.

In its left handed swing the arm carries the pawl over at least one of the ratchet teeth. During the reverse motion of the carriage on the other hand, the foot 203 presses against the stationary abutment 204 and swings the pawl arm in right handed rotation moving the pawl 195 to the right, causing it to engage one of the ratchet teeth and as the pawl continues to advance the ratchet is turned a corresponding step in right handed rotation. This motion is transmitted by the train of gearing described, including bevels 296, 197, worm 184, worm wheel 183, which is correspondingly rotated advancing the rack 178 and the pusher 177 a corresponding step, the label pack being likewise positively advanced.

The front end of the label box or trough is open, Fig. 26, at 207 in accordance with the regular practice and the advance of the labels is checked by prongs 208 mounted on uprights 209 at the sides of the trough. Each of the prongs 208 is supported on a horizontal forwardly projecting rod 210, having a flattened pointed hook 211 comprising the prongs 208 at the forward end which projects in front of the label pack as shown and each of these wires 210 is mounted in a block 212 which is apertured to slide on the upright studs 209, being held in adjusted position by a set screw 214.

In addition to the foregoing, the forward extremities of the top 174 and the bottom 215 of the box 175 are shown as bent downwardly and upwardly respectively, i. e., toward the center of the box providing lips 216 and 217 which have a limited tendency to retain the labels in position in the box. The pusher 177, see Figure 27, is also convex as to its forward surface at 218, the curve being mainly in a vertical plane so that the vertical centers of the labels are advanced and bent outwardly toward the bottles, one of which is illustrated fragmentarily at 219 in Figure 27.

At the end of each forward stroke of the carriage 101, the outer or foremost label 220 in the pack is brought in contact with the paste coated surface of a corresponding bottle 219 and due to the positive feed of the labels. In this way the label is pressed firmly against the bottle so that it adheres to the bottle, a very thin coating of paste being sufficient on account of the firm pressure applied in this way, and as the carriage is withdrawn, the outer label adhering to the bottle is separated from the pack and left in position adhering to the bottle. In this connection it will be understood that the rate of feed may be adjusted by adjusting the stroke of the pawl by means of the adjustable stop 205, but this would ordinarily not be changed. The position of the rack relatively to the carriage can be adjusted by means of the hand wheel 194 and relatively movable and adjustable discs 186, 187 which may be clamped in any desired position by means of the nut 192. In this way the pressure with which the labels are applied to the bottles may be adjusted.

The third and last agency or operating unit carried by the carriage 101 and brought into contact with the bottles at the end of the forward stroke is the label presser 7 or pressing pad 222, Figure 6. This pad is carried at the forward end of a rigid arm 223, which is rigidly mounted on the carriage being in the form of the invention shown secured by means of a set screw 224 in the apertured end 225 of a bracket 226 on said carriage 101.

The pad may be adjusted at the will of the operator by loosening the set screw 224 and sliding the arm 223 through the aperture in the rounded end 225 of the bracket 226. To avoid displacement of the labels by the pad, means is provided for positioning them in advance of the application of the pressure of the pad thereto. To this end the pad and the solid support 301 therefor are apertured in the direction of motion of the carriage 101 at several points 227, to receive the sliding pointed pins or prongs 228. These pins or prongs 228 are shouldered at 229 and a coil spring 230 is wrapped around the reduced end 231 of each pin. Each spring 230 engages the lower end of the aperture and the ends of pins 228 are then held out of contact with the bottom of the holes and the end of the traverse of the carriage is approached, the pins being shorter than the aperture 227, retire therein compressing the spring 230 whereby the points of the pins are held in close contact with the label being affixed and the bottle which supports it preventing slippage and displacement of the labels on the bottle, as the pad is advanced into pressing relation with the label.

The positive pressure supplied by the pad, together with the positive thrust affixing the labels and the thin coat of paste which it is possible to use on account of the positive thrust of the label packs against the bottle in affixing the label, eliminates buckling, wrinkling and bubbles. The thin coating of paste which it is possible to use with this mechanism contributes very largely to the result, the presence of an excess of paste having the effect of soaking the labels and causing them to buckle.

Figures 26 and 27, illustrate a label and label trough or rack, particularly adapted for use with tall, slim bottles. Figures 20 and 21 illustrate in front elevation and in place respectively, a label box and labels which are relatively short and broad, the labels being almost square and particularly adapted for use with short, wide or thick bottles, although square, or substantially square labels of the proper size may be applied to bottles of any proportions.

Figure 22:
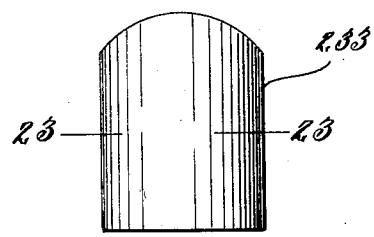
Figure 22 is an elevation of the label pack according to Figure 20.
Figure 23:
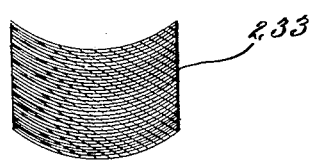
Figure 23 is a section on the line 23, 23 of Figure 22.
Figure 24:
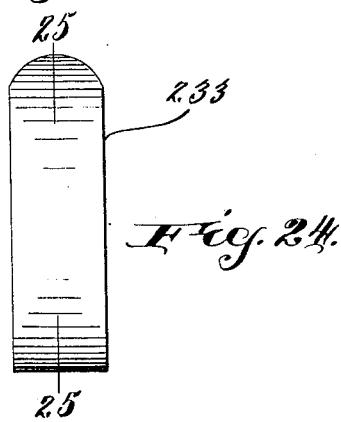
Figure 24 is an elevation of a label pack comprising labels of the long narrow type.
Figure 25:
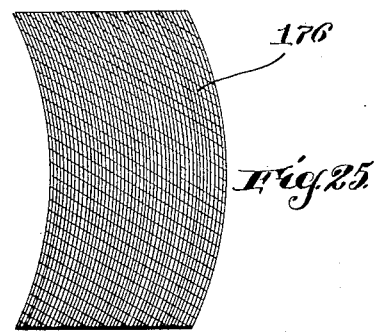
Figure 25 is a vertical section on the line 25, 25 of Figure 24.

In Figures 20 and 21 the label box or trough 23 is proportioned as just described, the labels being held against premature release by two sets of prongs 231 on each side. The top and bottom lips 216, 217 are omitted, also the label pusher 232, as shown, is convex in a horizontal or transverse plane so that the labels, instead of being flexed in a vertical plane, as illustrated in Figure 27, are flexed or deflected in a horizontal plane as illustrated in Figure 21. Figures 22, 23 and 24 are diagrammatic views of the label pack 233 deflected in a horizontal plane, and Figure 25 shows the pack 176 previously described deflected in a vertical plane.

In addition to the form of the machine, thus specifically described, the construction shown in Figures 1 to 28, inclusive, has been varied and elaborated by this inventor as illustrated in Figures 29 and 30.

Figure 29 is a top plan view of a machine like that described in connection with Figures 1 to 28, inclusive, has been varied and elaborated by this inventor as illustrated in Figures 29 and 30.

Figure 29 is a top plan view of a machine like that described in connection with Figures 1 to 28, inclusive, with the exception that instead of a single carriage 101 advancing to and receding from the path of the bottles, on one side, there are two carriages 301, 302, operated by oppositely disposed cranks and connecting rods 303, 304, 305, 306, with oppositely disposed pasting pads 307, 308 on the respective carriages 301, 302, said pasting pads carried by arms 309, 310, as previously described and similarly operated. This machine also includes oppositely disposed label troughs 311, 312, and oppositely disposed pressing pads 313 and 314, carried by rods 315 and 316 on the respective carriages 301 and 302, all of which corresponding members are simultaneously operated by the two carriages 301, 302 and brought into contact with the opposite sides of the bottles at the same time, labeling both sides of each bottle simultaneously. The machine constructed in this way can also obviously be used for labeling one side of each of two bottles simultaneously, the bottles being fed in pairs for this purpose.

Figure 30 shows in plan more or less diagrammatically the application of the same mechanism to a machine which is adapted to label one side of each of four bottles simultaneously or both sides of two bottles when the bottles are fed in groups of four or in pairs. In this machine there are two carriages 401, 402 simultaneously and oppositely operated. Each of these carries in close juxtaposition, two pairs of paste daubers or pads 403 on the carriage 401 and 404 on the carriage 402. The machine also includes two label feeding troughs closely juxtaposed on each of said carriages, the troughs on the carriage 401 being indicated by reference characters 405 and the label feeding troughs on the carriage 402 being indicated by reference character 406. The disclosure also comprises two label pressers on each of said carriages, the label pressers on the carriage 401 being indicated by reference character 407 and the label pressers on the carriage 402 being indicated by reference character 408. The label pressers are mounted side by side in a manner similar to those previously described so that each of the two pressers is mounted on a single adjustable rod 416, 417, corresponding to the rods 315, 316, Figure 29, and to the rod 223, Figure 6.

The label pressers on each carriage have the same operation as the single presser on the single carriage, Figures 6 and 11, and the pasting pads 403, 404 are each mounted on a single pivoted arm 409, 410 actuated similarly and operated similarly to the arms described in connection with the single machine.

In the operation of a machine of the type shown in Figures 1 to 28, inclusive, the bottles being placed in the feed trough 45, see Figures 1 and 3, are thrust forwardly in the direction of feed, i. e., to the right in Figure 1, either by hand or in any convenient manner, whereby they are caused to pass from the trough along the trough bottom or bottom plate 46 to the forward end 47 thereof, Figure 3, at which point they pass onto the main or bottom feed belt 2, which furnishes a continuous feeding impulse throughout the operation of the machine. The belt also supports the bottles and in turn rests on the top 48 of table 43. As soon as they leave the support of the trough sides, the bottles are engaged by the bottom side guides 33 shown in side elevation in Figure 1 and in section in Figure 12 and by top side guides 38. A top feed belt 33 may be provided wherever needed, particularly in the case of a machine which is labeling the long thin type of bottles already specified.

The longitudinal adjustment for the pulley 29 which carries the bottom feed belt at the front or feeding end of the machine is shown at 23 in Figure 1, the adjustment being shown as of the screw type, and there is a vertical adjustment for the top feed belt at 13.

As the bottles advance, their progress is arrested by the releasing and spacing mechanism 4, the cut off gates 55 and the releasing and spacing gates 56 being operated simultaneously and oppositely to cut off one bottle at a time from the line by means of the gate 55 and to release this bottle, the bottle at the same time to be carried forward by the feed belt or belts, the operation of this mechanism being timed by the cam 80 in relation to the motion of the belts to space the bottles in accordance with the spacing of the respective paste coating mechanism 5, the label feeding and affixing mechanism 6 and the pressing mechanism 7, which are carried on the laterally reciprocating carriage 101.

To make the operation entirely clear, it should be noted that the motion of the line of bottles is checked by gates 56 and the first bottle is cut off from the load by gates 55 which then hold the line while the first bottle is released by the opening of gates 56. These gates 56 are then closed and gates 55 open to admit a bottle to advance into engagement with gate 56. The operation is then repeated by the closing of cut off gate 55 cutting this final bottle from the load and the opening of gate 56 to release the same.

It is of interest to note that as the cutoff gates 55 close, cutting off the forward bottle from the line and the releasing gates 56 open, permitting this bottle to start into operative traverse along the belts and guiding ways, the bevels 52 at the edges of the gates 55 have a cam or wedgelike operation on the edges of the bottle being released, imparting to it a forward thrust which tends to accelerate it in unison with the acceleration imparted to it by the bottom belt, avoiding the tendency to tip backwards.

The bottles are held stationary to permit the operation of the respective mechanisms 5, 6, 7 by the bottle holding or bottle clamping pads shown in top plan, Figure 11, and indicated by reference characters 105 to 110. The operation of these pads by means of the rack 125, which is, in turn, actuated by the cam 135, Figure 8, is simultaneous as is also the operation of the paste coating mechanism 5, the label feeding and affixing mechanism 6 and the presser 7, the bottles being spaced by the cutoff and releasing mechanism according to the spacing of these mechanisms 5, 6, 7, and they are held in the path of these respective mechanisms by the clamping mechanisms 105 to 110, as already pointed out. It will also be understood that the bottles thus spaced and operated upon simultaneously are released from the clamping mechanisms and move simultaneously after each operation, each bottle going to the next station in time for the succeeding operation until each bottle passes the pressing mechanism 7 and is discharged from the machine by the belt 23 into any suitable delivery mechanism or receptacle.

The quick, positive and uniform action of the paste coating mechanism 5 applying a thin and uniform coat of paste to each bottle by the direct pressure thereagainst of the paste coating pad 140, together with the positive action of the label feed already described, the labels being fed and thrust forward positively in the label box 174 by the rack 178, so that at the end of the forward traverse of the carriage 101, the front label of the pack is pressed firmly and positively against the bottle, the position of the rack 178 relatively to the carriage 101 at any time being determined by the operation of the hand wheel 194 when the power drive is released by disconnecting the discs 186 and 187. The positive action of the presser mechanism 71 which is preferably rigidly connected to the carriage 101 as shown in Figure 6, also contributes to the improved result obtained whereby the labels are not only handled with increased rapidity as already pointed out, but are affixed to the bottles in flat condition without wrinkling or formation of air bubbles, the thin uniform coating of paste covering the entire area underlying the label, together with the positive pressure with which the label is applied, making it possible to remove the front label from the pack by means of this thin coating of paste avoiding the presence of an excess of paste which would cause the label to swell and buckle, and would tend to the formation of air bubbles.

The improved label presser described, whereby the protecting pin or pins 228 serve to hold the label in position as the pressing pad is applied is also of great advantage in preventing displacement of the labels.

In addition to the foregoing, the machine may be adapted as already pointed out, to not only label one bottle on one side as described in connection with Figures 1 to 28, inclusive, but by constructing the machine as illustrated in Figures 29 and 30, it is made possible to label one bottle on two sides as shown in Figure 29, or by feeding the bottles 2 at a time to label two bottles simultaneously on one side by the machine illustrated in Figure 29 or by means of the machine illustrated in Figure 30, by feeding the bottles four at a time four bottles may be labeled simultaneously on one side or by feeding the bottles two at a time, two bottles may be labeled on two sides simultaneously.

The manner of doubling the machine, providing two laterally reciprocating carriages, one on each side of the feeding belts, making it possible to apply two labels, one on each side of a single bottle, or to label two bottles each on one side, has been fully described. In the operation of the machines, Figure 29, the bottles are fed singly to apply two labels to one bottle or in pairs to apply one label to each of two bottles. The machine, Figure 30, in which there are two laterally reciprocating carriages, one on each side of the feed belts or ways, each carriage having the paste coating, label feeding and applying and label pressing mechanisms doubled, has also been described, the function of this machine being to apply one label to each of four bottles, the bottles being fed four at a time, or to apply two labels to each of two bottles, the bottles being fed two at a time.

I have thus described specifically and in detail a machine embodying my invention in the form in which it has been constructed and other modifications of this machine, in order that the manner of constructing, operating, applying and using the invention may be fully understood, however, the specific terms herein are used descriptively rather than in a limiting sense, the scope of the invention being defined in the claims.

What I claim as new and desire to secure by Letters Patent is:

1. In a machine for labeling bottles and the like, means for feeding the bottles through the machine, paste coating and label affixing mechanism spaced along the path of the bottles as fed, and means for spacing the bottles comprising two pairs of gates, and means for operating the gates simultaneously and oppositely at intervals corresponding to the speed of the feeding motion and adapted to space the bottles in accordance with the spacing of the paste coating and label affixing mechanisms.

2. In a machine for labeling bottles and the like, means for feeding the bottles through the machine, paste coating and label affixing mechanism spaced along the path of feed and means for spacing the bottles comprising two pairs of gates, and means for operating the gates simultaneously and oppositely at intervals adapted to space the bottles in accordance with the spacing of the paste coating and label affixing mechanisms, the pair of gates which is nearest the delivery end of the machine serving to cut the front bottle from the load and having camlike surfaces tending to advance the front bottle then cut off, as said cutoff gates are closed and the other pair of gates is opened.

3. In a machine for labeling bottles and the like a feed belt, paste coating and label feeding and affixing mechanism spaced along the belt, means for operating the same, and means for spacing the bottles on the belt comprising two gates operated transversely to the feed simultaneously and oppositely, and spaced in the direction of the feed, the gate which is nearest the feed end having means for thrusting the bottle forward as the gate is closed.

4. In a machine for labeling bottles and the like, labeling mechanisms suitably spaced, means for feeding the bottles to said labeling mechanisms, and means for spacing the bottles according to the spacing of the labeling mechanisms, comprising two simultaneously and oppositely operated pairs of gates, two transversely oppositely moving members, each carrying one gate of each pair, and means for operating said transversely moving members and timing them in relation to the belt to give the said spacing.

5. In a machine for labeling bottles and the like, means for feeding the bottles to said labeling mechanism, labeling mechanisms suitably spaced along the path of the feed, and means for spacing the bottles according to the spacing of the labeling mechanisms, comprising two simultaneously and oppositely operated pairs of gates, two transversely and oppositely moving members, each carrying one gate in each pair, and means for operating said transversely moving members and timing them in relation to the belt to give the said spacing, said means for operating the transversely moving members comprising a cam, a lever to the opposite ends of which said oppositely moving members are connected, said lever being pivoted intermediately said ends, and means connecting said lever to said cam.

6. In a machine for labeling bottles and the like, a belt for feeding the bottles, labeling mechanisms suitably spaced along the path of the belt, and means for spacing the bottles according to the spacing of the labeling mechanisms, comprising two simultaneously and oppositely operated pairs of gates, two transversely and oppositely moving members, each carrying one gate in each pair, and means for operating said transversely moving members and timing them in relation to the belt to give the said spacing, said means for operating the transversely moving members comprising a cam, a lever to the opposite ends of which said oppositely moving members are connected, said lever being pivoted intermediately said ends, and means connecting said lever to said cam, the connection between said cam and said gates comprising a yielding element.

7. In a machine for labeling bottles and the like a continuously operating feeding means for moving the bottles through the machine, labeling mechanisms spaced along the feeding means for spacing the bottles comprising two sets of simultaneously and oppositely operating gates, two simultaneously and oppositely and transversely operating slides, one gate of each pair being connected to each of said slides, an intermediately pivoted lever connected at each end to a corresponding one of said slides, a cam, a longitudinally moving slide operated by the cam, and means connecting said slide to said lever, the connections from the cam to the gates including yielding means to prevent injury to the bottles.

8. In a labeling machine a way for bottles and the like, means for feeding bottles along the way and labeling means placed along the way, said labeling means including a pasting pad, a swinging arm carrying said pad, a laterally reciprocating carriage carrying said labeling mechanisms, including said arm and pad, a paste supply for said pad upon the path of the feed, means on said carriage tending to bring said arm to midposition and permitting it to swing, stationary means for swinging said arm and means connected to the arm to engage said stationary means on each reciprocation of the carriage swinging the arm and reversing its position, the motion of the carriage and the swinging of the arm serving to bring the pad at one end of its swing in contact with a bottle on the way and at the other end into engagement with the paste supply.

9. In a labeling machine, a way, means for feeding the bottles longitudinally of the way, means for spacing the bottles and labeling means spaced along the way, said means including a pasting pad, a swinging arm carrying said pad, a laterally reciprocating carriage carrying said labeling mechanisms, including said arm and pad, means on said carriage tending to bring the arm to midposition and permitting it to swing, stationary means for swinging said arm and means on the arm to engage said stationary means on each reciprocation of the carriage swinging the arm through said arc of substantially 180 degrees, said stationary means being in the nature of a cam, and said means on the arm comprising a follower engaging said cam.

10. In a machine for labeling bottles having a continuously operating feeding means, a way and a transversely reciprocating carriage and labeling means for the bottles mounted on said carriage to engage the bottles on said way at the end of each complete stroke, said means comprising a label trough, means at the front end of the trough tending to retain the pack of labels therein and operating to release the forward label, and a positively operating feeding member pressing said labels forward, said positive feed including means for operating the feed at a rate proportionate to the number strokes of the carriage.

11. In a machine for labeling bottles having a continuously operating feeding means, a way, means for spacing the bottles on said way and a transversely reciprocating carriage and labeling means for the bottles mounted on said carriage to engage the bottles on said ways at the end of each complete stroke, said means comprising a label trough, means at the front end of the trough tending to retain the pack of labels therein and operating to release the forward label, and positively operating feeding means pressing said labels forward, said feed including means for operating the feed in proportion to the strokes of the carriage, and a rack and ratchet and pawl mechanism on the carriage, and operated by the strokes of the carriage with gear connections from said racket to said rack.

12. In a machine for labeling bottles having a continuously operating feeding means, a way, means for spacing the bottles on said way, a transversely reciprocating carriage and labeling means for the bottles mounted on said carriage to engage the bottles on said feed at the end of each complete stroke, said means comprising a label trough, means at the front end of the trough tending to retain the pack of labels therein and operating to release the forward label, positively operated feeding member pressing said labels forward, said positive feed including means operating the feed at a rate proportionate to the number of strokes of the carriage, and means for adjusting said feed relatively to the carriage.

13. In a machine for labeling bottles and the like, means for feeding the bottles, a transversely moving carriage having labeling means thereon including a label presser, said presser having projecting prongs to engage the labels and prevent displacements thereof and yielding means supporting said prongs and permitting them to retire as the pad advances into closed contact with the label.

14. In a machine for labeling bottles, feeding means, for feeding bottles along a predetermined path, means for spacing the bottles along the said path, a transversely moving carriage having thereon a pasting pad, a labelholder with means for feeding and supporting the labels in positive relation to said carriage and a presser also rigidly supported on said carriage, and means for adjusting said label feed and said presser relatively to said carriage.

15. In a machine for labeling bottles, means for feeding the bottles, along a predetermined path, means for spacing the bottles along said path of feed, a transversely moving carriage and successive labeling mechanisms spaced along the carriage, means for holding the bottles in the paths of said labeling mechanisms, comprising bottle engaging members, a toothed segment for actuating each said member and a rack for actuating said toothed segments, means for reciprocating the rack, said rack engaging directly with part of said segments and a pinion for transmitting and reversing the motion of said rack as applied to the remainder of said segments.

16. In a machine for labeling bottles, means for feeding the bottles, along a predetermined path, means for spacing the bottles along said path of feed, a transversely moving carriage and successive labeling mechanisms spaced along the carriage, means for holding the bottles in the paths of said labeling mechanisms, comprising bottle engaging members, a toothed arc for actuating each said member and a rack for actuating said toothed segments, means for reciprocating the rack, said rack engaging directly with half of said segments and a pinion for transmitting and reversing the motion of said rack as applied to the remainder of said segments, yielding means for connecting said pad to said segments in the bottle engaging motion and positive means communicating the motion of said segments to said pads in the direction of retraction from the engaging position.

17. In a machine for labeling bottles, means for feeding the bottles, a way, means for spacing the bottles on the way, a transversely moving carriage and successive labeling mechanisms spaced along the carriage, means for holding the bottles in the paths of said labeling mechanisms comprising bottle engaging members and means timed with the motion of the carriage for opening and closing said engaging members, releasing the bottles to permit them to move forward after each operation and to engage the bottles and hold them for each succeeding operation, said latter means including yielding means permitting said engaging means to yield in the engaging motion.

18. In a machine for labeling bottles and the like a feed a way, means for spacing the bottles on the way, and a plurality of reciprocating carriages, one on each side of the way, means for operating said carriages oppositely and simultaneously to advance both carriages toward the way at the same time, each of said carriages having a pasting mechanism, a label holding and feeding mechanism and a label pressing mechanism suitably spaced to conform to the said spacing mechanism, whereby a single bottle may be labeled on both sides or two bottles may be fed simultaneously, each of said two bottles being labeled on one side, and means for holding the bottles on the feeding means in operative relation to said mechanisms on the carriages in correspondence with the operation of said carriages.

19. In a machine for labeling bottles and the like, means for feeding the bottles, a way, means for spacing the bottles on the way, a transversely reciprocating carriage on each side of the way, means for operating said carriages oppositely and simultaneously, each said carriage having a paste coating mechanism adapted to coat two bottles at a time, a mechanism for feeding labels adapted to handle two packs of labels and present two labels to two bottles at a time, and a pressing mechanism adapted to press the labels on two bottles simultaneously, and means for holding the bottles on the feeding means in operative relation to said mechanism on the carriages in correspondence with the operation of said carriages, whereby the bottles being fed four at a time, one label may be applied to each of four bottles at a single operation or two labels may be applied to each of two bottles fed in pairs.

20. In a machine for labeling bottles, a way, means for feeding bottles along the way, means for spacing the bottles on the way, a transversely moving carriage and successive labeling mechanisms spaced along the carriage, means for holding the bottles in the paths of said labeling mechanisms comprising bottle engaging members mounted to swing and engage the bottles on opposite sides, means for actuating said engaging means, said actuating means being yieldingly connected to said engaging means for motion in the direction of closing and positively connected for motion in the opposite direction.

21. A machine for labeling bottles, a way, means for feeding the bottles along the way, a transversely moving carriage and successive labeling mechanism on the carriage, means for holding the bottles in the paths of the labeling mechanisms, said labeling mechanisms including a paste pad, means for supplying paste to the pad at the end to the path of the carriage opposite the way, an arm carrying said paste pad and pivotally mounted on the carriage, and means for swinging said arm at each stroke of the carriage forwardly in the direction of the motion of the carriage, advancing the paste pad at a speed exceeding that of the carriage whereby the pad is thrust against the paste supply at one end of the path of the carriage, and thrust against a bottle on the way at the other end of the path of the carriage.

Signed by me, at Baltimore, Maryland, this 3rd day of May 1930.

CHARLES H. WILD.